(12) United States Patent
Linnell et al.

(10) Patent No.: US 9,987,753 B1
(45) Date of Patent: Jun. 5, 2018

(54) LINEAR FORCE CONTROL OF ROTATION OF A KNOB CONTROLLER

(71) Applicant: X Development LLC, Mountain View, CA (US)

(72) Inventors: Jeffrey Linnell, Woodside, CA (US); Tobias Kinnebrew, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 441 days.

(21) Appl. No.: 14/924,945

(22) Filed: Oct. 28, 2015

(51) Int. Cl.
| | |
|---|---|
| *G06F 3/033* | (2013.01) |
| *G09G 5/00* | (2006.01) |
| *B25J 13/08* | (2006.01) |
| *G06F 3/041* | (2006.01) |
| *G06F 3/0362* | (2013.01) |
| *G06F 3/0488* | (2013.01) |

(52) U.S. Cl.
CPC ........... *B25J 13/081* (2013.01); *B25J 13/085* (2013.01); *G06F 3/0362* (2013.01); *G06F 3/041* (2013.01); *G06F 3/04883* (2013.01); *G06F 2203/04808* (2013.01)

(58) Field of Classification Search
CPC .... E05B 13/106; E05B 83/32; Y10T 70/5832; A63F 13/24; A63F 13/285; A63F 13/837; G08B 6/00; H02K 49/10
See application file for complete search history.

(56) References Cited

U.S. PATENT DOCUMENTS

| | | | |
|---|---|---|---|
| 5,004,391 | A | 4/1991 | Burdea |
| 5,587,937 | A | 12/1996 | Massie et al. |
| 6,833,846 | B2 | 12/2004 | Hasser |
| 7,327,348 | B2 | 2/2008 | Goldenberg |
| 7,978,186 | B2 | 7/2011 | Vassallo |
| 8,072,418 | B2 | 12/2011 | Crawford |

(Continued)

FOREIGN PATENT DOCUMENTS

JP 2005068935 A 3/2005

OTHER PUBLICATIONS

Kickstarter, "SPIN remote—The Simplest, most Stylish remote ever", Dec. 2, 2014, <https://www.kickstarter.com/projects/spinremotelspin-remote-the-simplest-most-personal-remote-ever>.

(Continued)

*Primary Examiner* — Insa Sadio
(74) *Attorney, Agent, or Firm* — McDonnell Boehnen Hulbert & Berghoff LLP

(57) ABSTRACT

Example implementations may relate to a controller system having a moveable member. In particular, the controller system may include a rotatable knob having a curved surface, at least one motor that is operable to apply torque to the rotatable knob, a curved touchpad arranged to sense touch gestures on the curved surface, and a moveable member that is mechanically adjustable between a first position and a second position. In the first position, the moveable member is coupled to the rotatable knob and extends radially from the curved surface along a radial axis, such that application of a force perpendicular to the radial axis to the moveable member causes rotation of the rotatable knob. While in the second position, the moveable member provides accessibility to the curved surface of the rotatable knob.

20 Claims, 25 Drawing Sheets

(56) References Cited

U.S. PATENT DOCUMENTS

| | | | |
|---|---|---|---|
| 8,106,317 B2 | 1/2012 | Kitazumi | |
| 8,531,392 B2 | 9/2013 | Branton et al. | |
| 9,069,396 B2 | 6/2015 | Adler et al. | |
| 2002/0036622 A1 | 3/2002 | Jaeger | |
| 2004/0257339 A1 | 12/2004 | Takahashi | |
| 2006/0010942 A1* | 1/2006 | Toloday | E05B 63/0065 70/210 |
| 2007/0236450 A1 | 10/2007 | Colgate et al. | |
| 2009/0009491 A1 | 1/2009 | Grivna | |
| 2014/0267038 A1* | 9/2014 | Adler | G06F 3/038 345/161 |
| 2016/0089212 A1 | 3/2016 | Balicki et al. | |

OTHER PUBLICATIONS

Badescu, Mircea; Wampler, Charles; Mavroidis, Constantino; "Rotary Haptic Knob for Vehicular Instrument Controls"; Proceedings of the 10th Symp. on Haptic Interfaces for Virtual Envir. & Teleoperator Systs. (HAPTICS'02); 2002; IEEE.

* cited by examiner

LINEAR FORCE CONTROL OF ROTATION OF A KNOB CONTROLLER

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems capable of working alongside humans becomes apparent. Therefore, a demand for such robotic systems has helped open up a field of innovation in controllers, sensing techniques, as well as component design and assembly.

SUMMARY

Example implementations may relate to a controller system that includes a rotatable knob having a curved surface as well as a moveable member, among other components. The moveable member may be mechanically adjustable between a first position and a second position. In the first position, the moveable member is coupled to the rotatable knob and extends radially from the curved surface along a radial axis. With this arrangement, application of a force to the moveable member (e.g., the force being perpendicular to the radial axis) causes rotation of the rotatable knob. Whereas, while in the second position, the moveable member provides accessibility to the curved surface of the rotatable knob.

In one aspect, a controller system is provided. The controller system includes a rotatable knob having a curved surface. The controller system also includes at least one motor that is operable to apply torque to the rotatable knob. The controller system additionally includes a curved touchpad arranged to sense touch gestures on the curved surface. The controller system further includes a moveable member that is mechanically adjustable between a first position and a second position. In the first position, the movable member is coupled to the rotatable knob and extends radially from the curved surface along a radial axis, such that application of a force perpendicular to the radial axis to the moveable member causes rotation of the rotatable knob. In the second position, the movable member provides accessibility to the curved surface of the rotatable knob.

In another aspect, a controller is provided. The controller includes a rotatable knob having a curved surface, where the curved surface has a recess formed thereon. The controller also includes at least one motor that is operable to apply torque to the rotatable knob. The controller additionally includes a curved touchpad arranged to sense touch on the curved surface. The controller further includes a lever that (i) has an end that is coupled onto the curved surface and (ii) is mechanically adjustable between a first position and a second position by way of rotation about the end. In the first position, the lever extends along a radial axis relative to the curved surface, such that application of a force perpendicular to the radial axis to the lever causes rotation of the rotatable knob. In the second position, the lever is adapted onto the recess and provides accessibility to the curved surface.

In yet another aspect, a method is provided. The method involves determining, by a computing device, position of a moveable member relative to a controller that comprises a rotatable knob having a curved touchpad arranged to sense touch on a curved surface of the rotatable knob, where the position is either (a) a first position at which the moveable member extends radially to the curved surface or (b) a second position at which the moveable member provides accessibility to the curved surface. The method also involves, based on the determined position, determining an operational mode for the controller from among a plurality of operational modes. The method additionally involves causing the controller to operate in accordance with the determined operational mode.

In yet another aspect, another system is provided. The system includes means for determining, by a computing device, position of a moveable member relative to a controller that comprises a rotatable knob having a curved touchpad arranged to sense touch on a curved surface of the rotatable knob, where the position is either (a) a first position at which the moveable member extends radially to the curved surface or (b) a second position at which the moveable member provides accessibility to the curved surface. The system also includes means for, based on the determined position, determining an operational mode for the controller from among a plurality of operational modes. The system additionally includes means for involves causing the controller to operate in accordance with the determined operational mode.

These as well as other aspects, advantages, and alternatives will become apparent to those of ordinary skill in the art by reading the following detailed description, with reference where appropriate to the accompanying drawings.

DETAILED DESCRIPTION

Figure 1A:
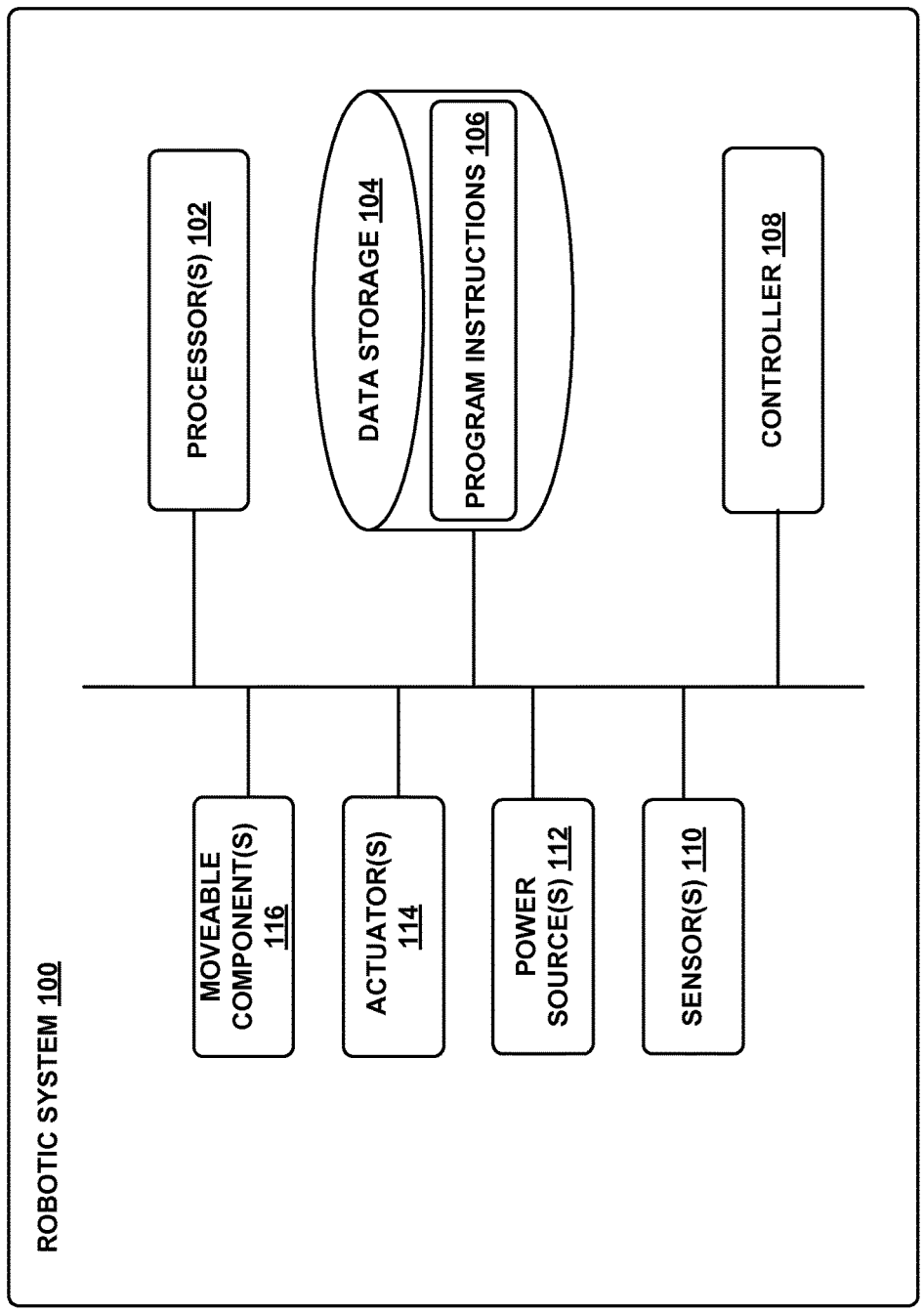
FIGS. 1A and 1B illustrate an example robotic system, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

According to various implementations, described herein is a controller system having a moveable member. In particular, an example embodiment may involve a hand-holdable controller that includes a knob as well as touch sensors (e.g., a curved touchpad) coupled to the rotatable knob. Rotation of the knob and touch data received from the touch sensors may collectively generate input data that represents intended control actions provided by a user holding the controller. Further, a motor may be configured to apply torque to the knob, so as to provide haptic feedback.

A computing device, such as a tablet, may receive input data from the controller and may interpret the input data to determine specific intended operations of a robotic system. Upon processing the input data to determine a particular interpretation, the computing device may send commands to a robotic system (or to another device) in order to cause the robotic system to carry out intended operations of various components such as actuators coupled to joints, end effectors, appendages, speakers, and/or light sources, among others.

In an example implementation, the controller system may include a moveable member that is adjustable between various positions. This moveable member could be coupled to the controller at all time or could be attachable to the controller (and/or detachable from the controller). More specifically, in a first position, the moveable member may be coupled to the knob and may extend radially (e.g., perpendicular) to the knob. With this arrangement, an external force (such as from a user) could be applied to the moveable member to cause rotation of the knob. This may therefore provide for an additional way in which a user can cause the rotation, such as in addition to application of an external torque directly onto the knob.

Moreover, the foregoing arrangement of a moveable member may also allow a user to apply a linear force via the moveable member, which is mechanically translated into rotation of the knob. Thus, such a moveable member may allow a user to provide linear input via the knob.

In a further aspect, the moveable member could be adjusted to a second position when the user no longer seeks to use the moveable member in the first position. In the second position, the moveable member is positioned so as to provide accessibility to the surface of the knob. This could allow a user to grasp onto any point on the surface of the knob without the moveable member being in the way, thereby allowing the user to provide various touch gestures on the knob and to smoothly transition between the various touch gestures.

An adjustment of the moveable member to the second position may involve completely detaching the moveable member from the knob or may involve the moveable member remaining coupled to the knob while being positioned so as to provide for the accessibility. By way of example, the moveable member may be a lever having an end that is coupled to the knob using a hinge. In this example, the lever could extend radially to the knob at the first position and could be adjustable to the second position by way of rotation about the end. Once adjusted to the second position, the lever may be adapted onto a recess formed on the knob (e.g., complementing the shape of the lever). In this manner, the moveable member could be adjustable between the first and second positions to provide for the intended purpose at each the respective position, among other advantageous use cases.

II. ILLUSTRATIVE SYSTEMS

Referring now to the figures, FIG. 1A shows an example configuration of a robotic system 100. Robotic system 100 may be any device that has a computing ability and interacts with its surroundings with an actuation capability and/or with ability to emit/generate physical phenomena such as light and/or sound, among others. For instance, the robotic system 100 may be a robotic arm, a humanoid robot, or a quadruped robot, among others. In other examples, robotic system 100 may define a vehicle, a watch, a washing machine, actuated blinds, a conveyer belt, a speaker, or a light bulb, among many other examples. Additionally, the robotic system 100 may also be referred to as a robotic device, a robotic manipulator, or a robot, among others.

The robotic system 100 is shown to include processor(s) 102, data storage 104, program instructions 106, controller 108, sensor(s) 110, power source(s) 112, actuator(s) 114, and moveable component(s) 116. Note that the robotic system 100 is shown for illustration purposes only and robotic system 100 may include additional components and/or have one or more components removed without departing from the scope of the disclosure. Further, note that the various components of robotic system 100 may be arranged and connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more moveable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, radio sensors, microphones, speakers, radar, cameras (e.g., color cameras, grayscale cameras, and/or infrared cameras), depth sensors (e.g., Red Green Blue plus Depth (RGB-D), lasers, structured-light, and/or a time-of-flight camera), motion sensors (e.g., gyroscope, accelerometer, inertial measurement unit (IMU), and/or foot step or wheel odometry), and/or range sensors (e.g., ultrasonic and/or infrared), among others. The sensor(s) 110 may provide sensor data to the processor(s) 102 to allow for appropriate interaction of the robotic system 100 with the environment. Additionally, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in robotic system 100). In other cases, an actuator may be a linear actuator that may be used in systems involving straight line motion. In either case, actuator(s) 114 may cause movement of various moveable component(s) 116 of the robotic system 100. The moveable component(s) 116 may include appendages such as robotic arms, legs, and/or hands, among others. The moveable component(s) 116 may also include a moveable base, wheels, and/or end effectors, among others.

The above description of processor(s) 102, data storage 104, program instructions 106, sensor(s) 110, and power source(s) 112 may apply to any discussion below relating to the respective component being used in another system or arrangements. For instance, FIGS. 2A and 3A (among other possible figures) illustrate processors, data storage, program instructions, sensors, and/or power sources as being incorporated in other arrangement. These components at issue may thus take on the same or similar characteristics (and/or form) as the respective components discussed above in association with FIG. 1A. However, the components at issue could also take on other characteristics (and/or form) without departing from the scope of the disclosure.

Figure 1B:
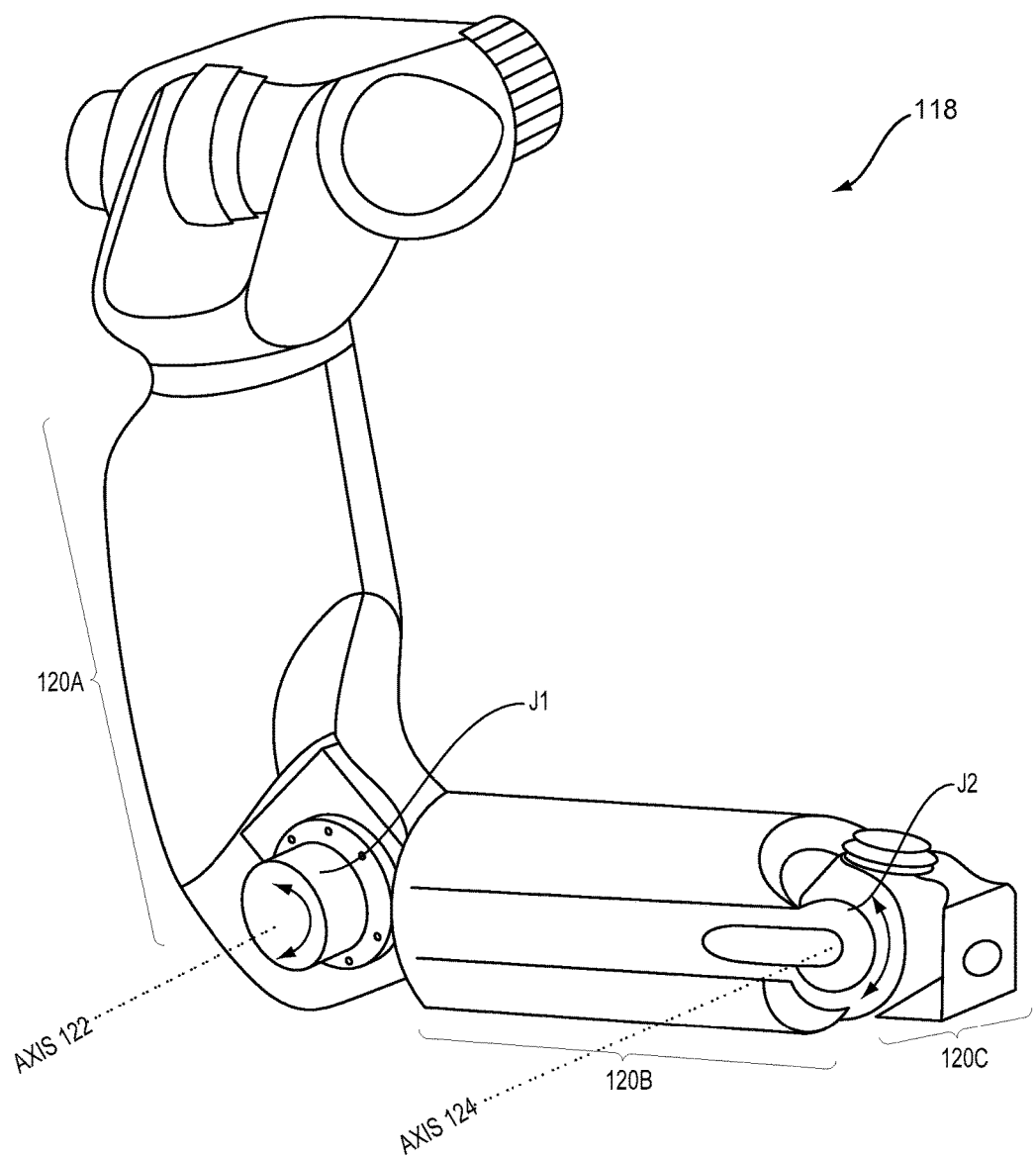

A robotic system 100 may take on various forms. To illustrate, refer to FIG. 1B showing an example robotic arm 118. As shown, the robotic arm 118 includes moveable component(s) 116 such as appendages 120A, 120B, and 120C, among others. Additionally, the robotic arm 118 includes joints J1 and J2, each coupled to one or more actuators (not shown) such as actuator(s) 114. The actuators in joints J1 and J2 may operate to cause movement of various moveable component(s) 116 such as appendages 120A, 120B, and 120C. For example, the actuator in joint J1 may cause movement of appendage 120B about axis 122 (e.g., resulting in rotation about an axis of joint J1). Whereas, the actuator in joint J2 may cause movement of appendage 120C about axis 124 (e.g., resulting in rotation about an axis of joint J2). Other examples may also be possible.

Figure 2A:
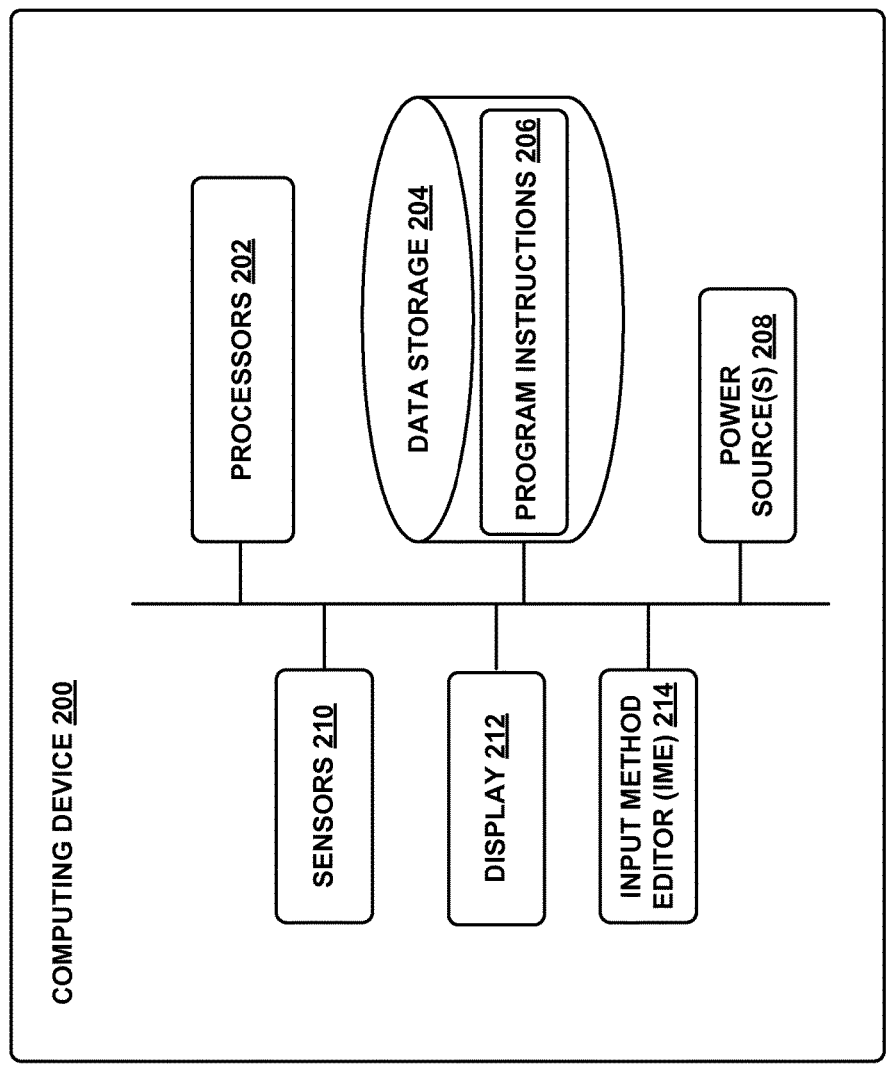
FIGS. 2A and 2B illustrate an example computing device, according to an example implementation.

FIG. 2A is a block diagram showing components of an example computing device 200 that includes one or more processors 202, data storage 204, program instructions 206, power source(s) 208, sensors 210, display 212, and Input Method Editor (IME) 214. Note that the computing device 200 is shown for illustration purposes only and computing device 200 may include additional components and/or have one or more components removed without departing from the scope of the disclosure. Further, note that the various components of computing device 200 may be arranged and connected in any manner.

Display 212 may take on any form (e.g., LED, LCD, OLED, etc.). Further, display 212 may be a touchscreen display (e.g., a touchscreen display on a tablet). Display 212 may show a graphical user interface (GUI) that may provide an application through which the user may interact with the systems disclosed herein.

Further, the computing device 200 may receive user input (e.g., from the user of the computing device 200) via IME 214. In particular, the IME 214 may allow for interaction with the GUI such as for scrolling, providing text, and/or selecting various features of the application, among other possible interactions. The IME 214 may take on various forms. In one example, the IME 214 may be a pointing device such as a computing mouse used for control of the GUI. However, if display 212 is a touch screen display, user touch input can be received (e.g., such as using a finger or a stylus) that allows for control of the GUI. In another example, IME 214 may be a text IME such as a keyboard that provides for selection of numbers, characters and/or symbols to be displayed via the GUI. For instance, in the arrangement where display 212 is a touch screen display, portions of the display 212 may show the IME 214. Thus, touch-input on the portion of the display 212 including the IME 214 may result in user-input such as selection of specific numbers, characters, and/or symbols to be shown on the GUI via display 212. In yet another example, the IME 214 may be a voice IME that may be used that receives audio input, such as from a user via a microphone of the computing device 200, that is then interpretable using one of various speech recognition techniques into one or more characters than may be shown via display 212. Other examples may also be possible.

Figure 2B:
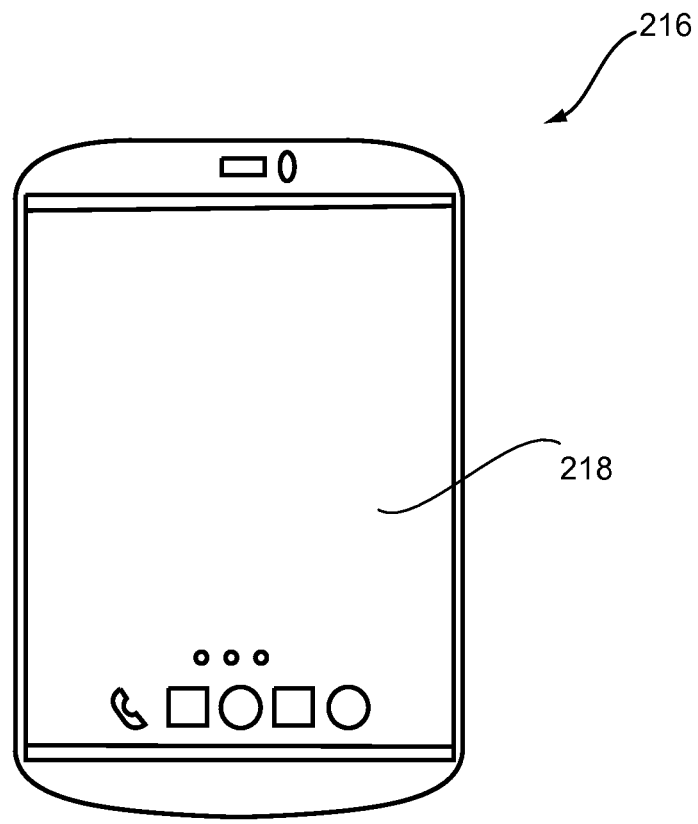

A computing device 200 may take on various forms. For instance, the computing device 200 may take the form of a desktop computer, a laptop, a tablet, a wearable computing device, and/or a mobile phone, among other possibilities. To illustrate, refer to FIG. 2B showing an example tablet 216. As shown, the tablet 216 includes touch-screen display 218 that is configured to display a GUI and receive user-input such as by way of one or more touch gestures provided by a user of the tablet 216. Note that the tablet may also include other components not shown and described herein.

Figure 3A:
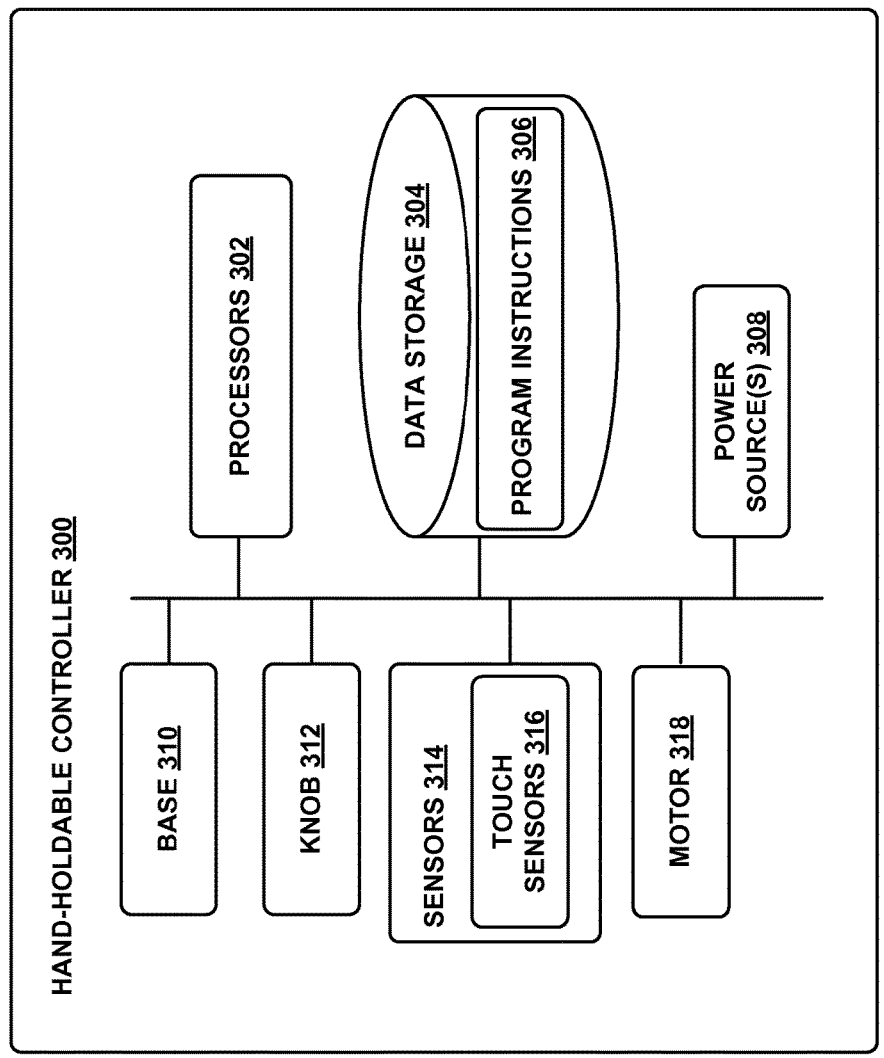
FIGS. 3A, 3B, 3C, and 3D illustrate an example hand-holdable controller, according to an example implementation.
Figure 3B:
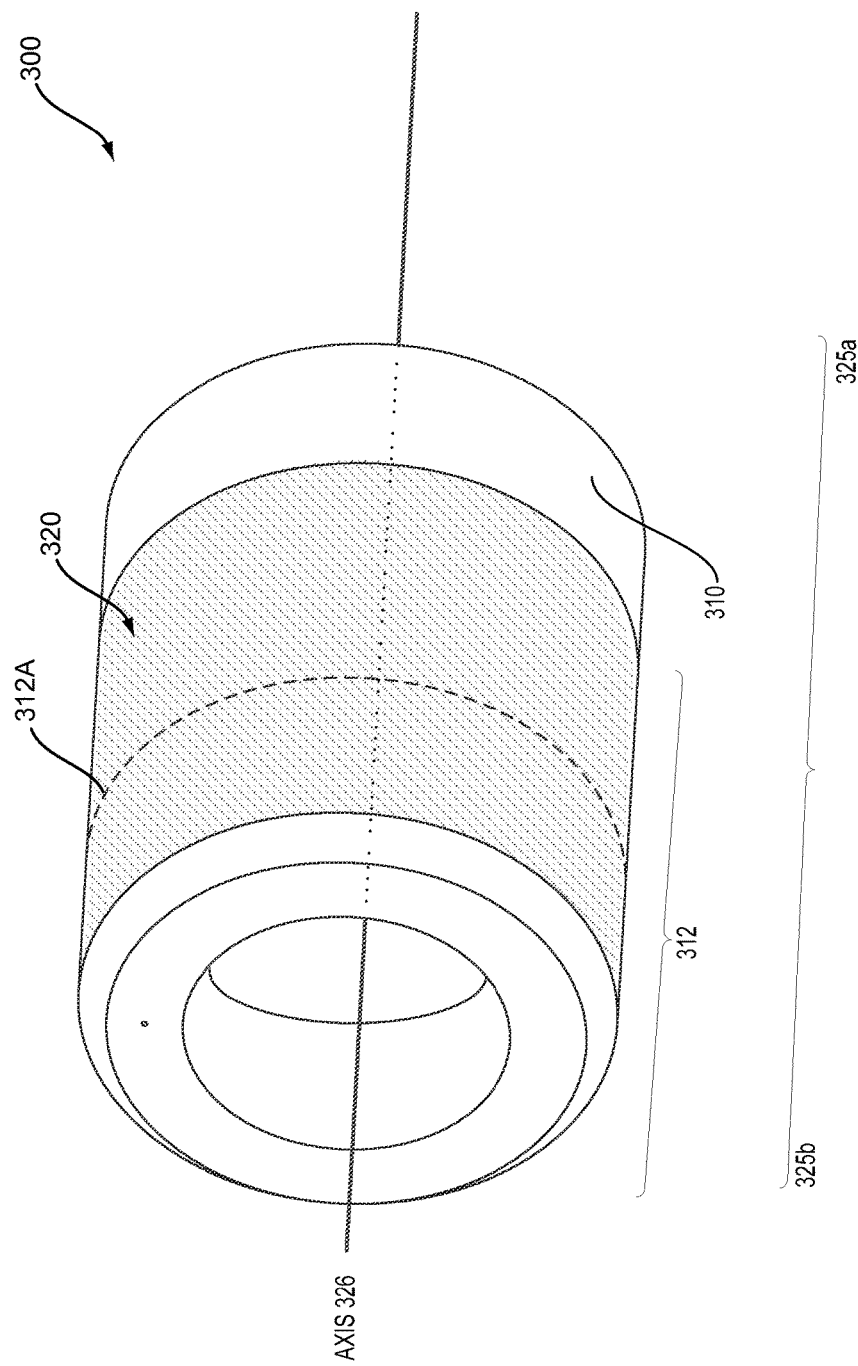

FIG. 3A is a block diagram showing functional components of a haptic hand-holdable controller 300, according to an example implementation. FIG. 3B is an illustration showing one possible implementation of a hand-holdable controller 300, which may include some or all of the components shown in FIG. 3A. A haptic hand-holdable controller 300 may also be referred to herein as a hand-holdable controller, a hand-holdable-controller system, a controller system, a wireless controller, or simply as a controller. In an example implementation, the components shown in FIG. 3A may be part of a hand-holdable controller with a motorized knob, which can also receive input via a curved touchpad on its outer surface. Other implementations, which utilize other components, are also possible.

In FIG. 3A, the hand-holdable controller 300 is shown to include one or more processors 302, data storage 304, program instructions 306, power source(s) 308, a base 310, a knob 312, sensors 314 such as touch sensors 316, and a motor 318. Note that the hand-holdable controller 300 is shown for illustration purposes only and hand-holdable controller 300 may include additional components and/or have one or more components removed without departing from the scope of the disclosure. Further, note that the various components of hand-holdable controller 300 may be arranged and connected in any manner.

Base 310 may be arranged so as to allow a user to grasp onto (e.g., hold) the hand-holdable controller 300 with one hand, while rotating the knob 312 with their other hand. Such a base 310 may be any shape, size, and/or form. Additionally or alternatively, the base 310 may be arranged to be positioned on and/or coupled to a surface or a robot joint (or another entity). With this arrangement, the user would not necessarily have to grasp onto the base 310 (e.g., so as to hold the controller 300) and could thus rotate the knob 312 with the controller 300 essentially positioned on and/or coupled to the entity. In a further aspect, this base 310 may be coupled to one or more other components of the hand-holdable controller 300, and/or may be integrated as part of a controller housing (e.g., that extends into a center cavity in the knob 312 such that the knob 312 can rotate about the portion of the housing that extends from the base 310).

Rotatable knob 312 can take on various forms, such as the cylindrical form shown in FIG. 3B, or a conical form, among other possibilities. References herein to a "cylindrical" knob or other "cylindrical" components of the controller should be understood to encompass cylindrical, conical and other forms of the knob 312 and/or other component. With such example arrangements, the controller 300 may be thus configured so that a user can provide input to the controller 300 by way of rotating the knob 312 about (e.g., relative to) the base 310. For example, the degree and/or speed of rotation of the knob 312 may provide input for control of, e.g., a robotic device.

Further, the hand-holdable controller 300 may include one or more sensors 314 such as any of the example sensors discussed above in the context of the sensor(s) 110 of robotic system 100. For instance, the hand-holdable controller 300 may include touch sensors 316 such as capacitive sensors, for example. The touch sensors 316 may be positioned and/or integrated within the knob 312 and/or within other components of the hand-holdable controller 300. For instance, the touch sensors 316 may be arranged to detect touch on one or more surfaces of the knob 312. To do so, the touch sensors 316 could, for example, take the form of a curved touchpad arranged along at least a portion of the one or more surfaces. With such example arrangements, touch data received via these touch sensors 316, such as during rotation of the knob 312, may be used to control various aspects of the robotic system 100 (e.g., via the computing device 200) and/or various aspects of the computing device 200 as further discussed below.

In an example implementation, such as that shown in FIG. 3B, the hand-holdable controller 300 may rotate about a central axis 326, and the touch sensors may be arranged to provide a curved touchpad 320, which may also be referred to as a cylindrical touch surface. In FIG. 3B, the cylindrical touch surface 320 is indicated by the crosshatch pattern on the surface of the knob 312. Further, in some implementations, the cylindrical touch surface 320 can extend around the entire outer surface of the knob (or portions thereof), such that the touch surface is a full cylinder (e.g., with no gaps in touch sensing anywhere in the circumference of the knob 312).

The hand-holdable controller 300 may additionally or alternatively include other tactile sensors as well. For example, hand-holdable controller 300 may include any sensor that generates information arising from physical interaction with the environment of the hand-holdable controller 300, such as capacitive sensors, positional feedback sensors, pressure sensors, proximity sensors, strain gauges, force sensors, temperature sensors, magnetic sensors, or others. For example, the hand-holdable controller 300 may include a proximity sensor (e.g., a Hall-effect sensor or an infrared sensor) to detect the presence of objects near the hand-holdable controller 300 but that are not in contact with the hand-holdable controller 300.

In some implementations, the hand-holdable controller 300 may not include any mechanical or structural interface features (e.g., mechanical buttons, switches, jacks, connectors, or controls), other than the knob 312. In such an implementation, the rotation of the knob 312 and tactile or touch input may be the only forms of user input that are possible via the controller 300. Alternatively, the hand-holdable controller 300 may include other interface features (not shown in the Figures) in addition to the knob 312. For example, the hand-holdable controller 300 may include a power switch or button, or other buttons, switches, jacks, connectors, or controls for providing input via the hand-holdable controller 300.

In an example implementation, the hand-holdable controller 300 may include at least one motor 318 that is operable to apply torque to knob 312. The motor 318 may be a brushed DC motor, a brushless DC motor, or an AC motor such as a synchronous electric motor or an induction motor, among other possibilities. Additionally, the motor 318 may include a motor shaft, a stationary stator, and a rotor coupled to the motor shaft such that the motor shaft is configured to deliver mechanical power to, for instance, a transmission assembly, thereby causing a rotation of the transmission assembly (which may be coupled to knob 312).

More specifically, the shaft of motor 318 may operably connected to the knob 312 and/or to a control component, such that the control component can receive an electrical input signal to control the rotation of the shaft (and thus the knob 312 as well). Alternatively, the knob 312 may be connected directly to the control component (e.g., not by way of a shaft), among other possible arrangements. For example, a slip ring or rotary transformer may be used to couple electrical signals between two parts that rotate in relation to each other, and thereby to power the rotatable portion of the hand-holdable controller 300 (e.g., to rotate the knob 312).

In a further aspect, the hand-holdable controller 300 may also include (i) potentiometers and/or variable capacitors that could be used for applications such as determining a rotary position of the knob 312 as the knob 312 rotates due to torque from the motor 318 and/or due to an external torque and/or (ii) a rotary switch that could be used to change configuration (e.g., power on or off) of the controller 300 in accordance with rotation of the knob 312 due to torque from the motor 318 and/or due to an external torque, among other components.

With the above example arrangement, the at least one motor 318 is controllable in order to vary the amount, and possibly the direction, of the torque that is applied to the knob 312. In particular, motor 318 may be operable to affect and/or resist rotation of the knob 312. For instance, the motor 318 may provide haptic feedback and/or change the "feel" of the knob 312 by applying torque to the knob in a clockwise or counter-clockwise direction. By way of example, the motor may be operable to, e.g., make rotation of the knob 312 by the user more or less difficult, to back drive a hand of a user holding the knob by way of rotational feedback, to rotate the knob 312 without additional torque being applied by a user, to replicate the feel of detents or clicks during the rotation of the knob, and/or to provide vibrational feedback, among other possibilities.

In a specific example, the controller 300 may control a joint of robotic system 100 (e.g., via computing device 200 as discussed below). In this example, the motor 318 could resist (or back drive) rotation of the knob 312 in response to a determination (e.g., by the computing device 200) that a moveable component coupled to the joint is entering a non-permissible zone (e.g., unsafe zone), such as within a threshold distance of a human for instance. Other examples are also possible.

As noted above, FIG. 3B shows an example implementation of a hand-holdable controller 300. As shown, the example hand-holdable controller 300 includes a base 310, a knob 312, and a motor (not shown) as well as any of the components discussed above in the context of hand-holdable controller 300. The controller 300 may have a proximate end 325a that is near the base 310 (illustrated in FIG. 3B near the bottom of the base 310) and a distal end 325b (illustrated in FIG. 3B near the top of the knob 312). The knob 312 may rotate or be rotated clockwise and/or counterclockwise about axis 326 in order to control a robotic system or a component thereof in various ways.

Further, touch data (or tactile data) may be received, during the rotation of the knob 312 or while the knob 312 is stationary, from one or more sensors (e.g., touch sensors 316 or tactile sensors) positioned on one or more surfaces of the knob 312. This touch data may affect the manner the robotic system 100 is being controlled. To illustrate, refer to example FIGS. 3C-3D showing different hand positions on the example hand-holdable controller 300.

Figure 3C:
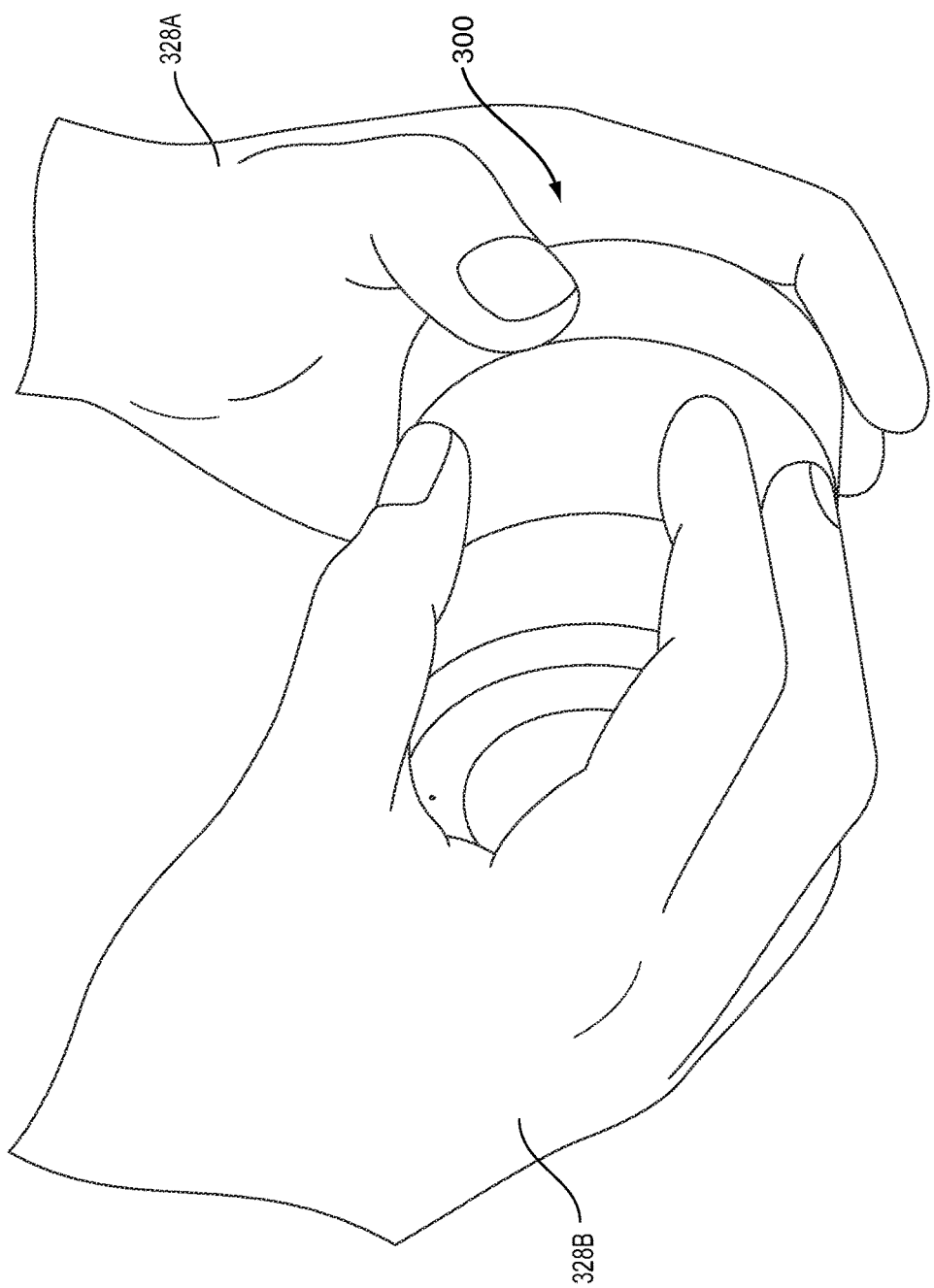

FIG. 3C shows a hand 328A of a user grasping onto the base 310 of the hand-holdable controller 300 such as for the purpose of holding onto the hand-holdable controller 300. Whereas, the other hand 328B of the user grasps onto the knob 312 such as for the purpose of providing user-input by rotation and/or touch of the knob 312. As shown, the hand 328B grasps onto a relatively large surface area of the knob 312 such as by several fingers as well as the palm on the surface area of the knob 312. The touch sensors may detect this particular touch gesture (e.g., this touch gesture may be referred to as a "full grip" or "full grasp") by the user and may provide corresponding touch data representing this particular touch gesture.

Figure 3D:
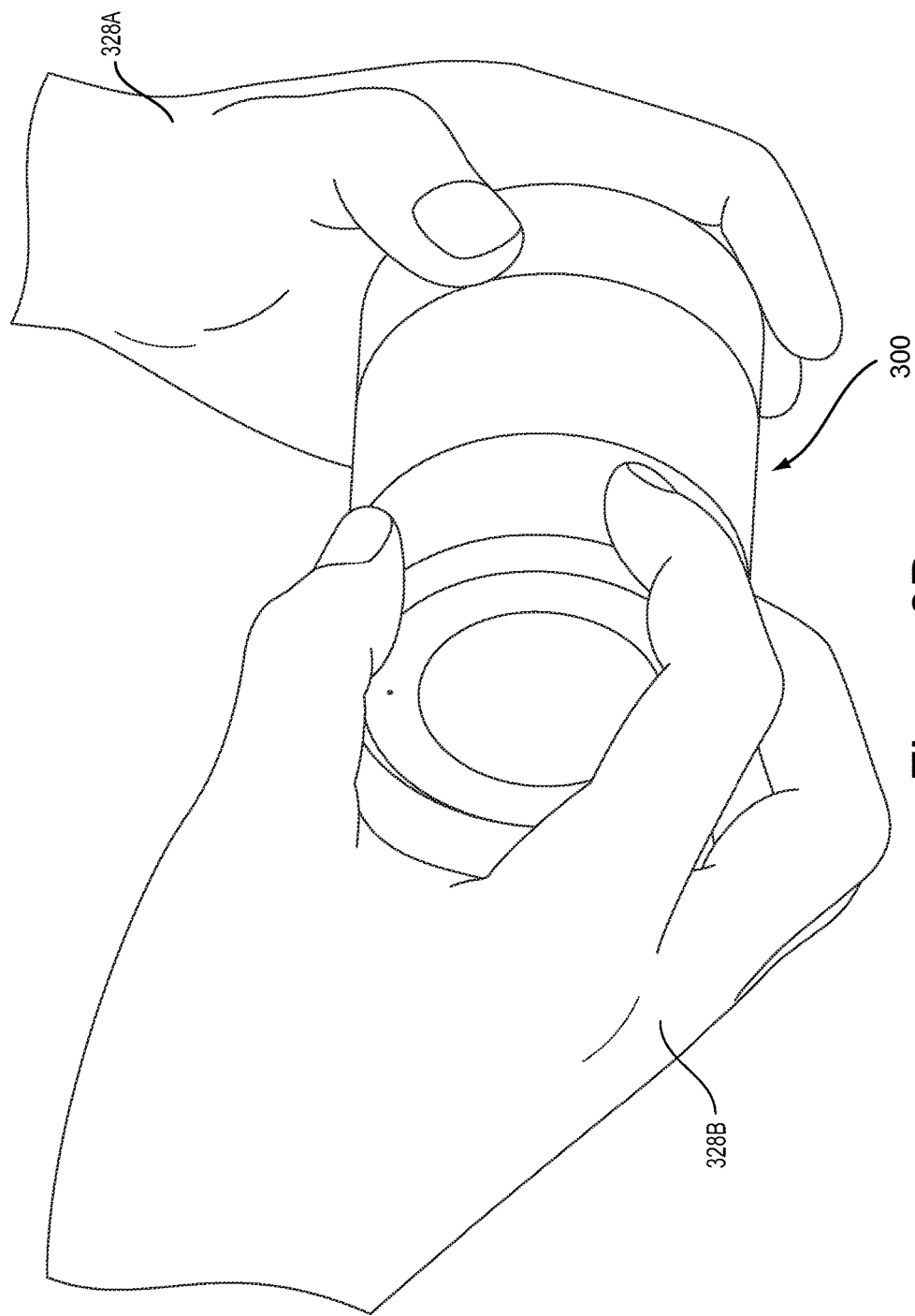

In contrast, FIG. 3D shows the hand 328A of the user grasping onto the base 310 in the same manner as in FIG. 3C. However, in this case, the other hand 328B of the user grasps onto a relatively small surface area of the knob 312 such as by placing only fingertips on the surface area of the knob 312 close to the distal end 325b. The touch sensors may detect this different particular touch gesture (e.g., this touch gesture may be referred to as a "fingertip grip" or "fingertip grasp") by the user and may provide different corresponding touch data representing this different particular touch gesture. As such, the touch illustrated in FIG. 3D may result in different control functionality of the robotic system 100 (and/or the computing device 200) than the touch illustrated in FIG. 3C. Moreover, different touch gestures may result in different control functionality even if the characteristics of the rotation of the knob 312 (e.g., amount and/or speed of rotation) are the same across different touch gestures and/or even if the component being controlled is the same across different touch gestures.

Many other example touch gestures (e.g., actions which may generate touch data, such as gestures, grips, grasps, touches, and/or other tactile information) may also be possible without departing from the scope of the disclosure. For example, the hand 328A of the user may grasp onto base 310 in the same manner as in FIGS. 3C and 3D. However, other touch gestures may include one or more of (i) a palming, (ii) a partial grip (with finger extension or retraction), (iii) a multi-finger sequence, (iv) a multi-touch, (v) a drag, (vi) a side surface hold, (vii) a side surface swipe, (viii) a fingertip only, (ix) a single tap (possibly at a certain location or within a certain area on the surface of the knob), (x) a double tap (possibly at a certain location or within a certain area on the surface of the knob), and/or (xi) a swipe or swipe pattern (possibly at a certain location or within a certain area on the surface of the knob), among other possibilities.

As one specific example, a palming grip may entail the palm of hand 328B to be placed on the top of the knob 312 (e.g., at the top of the proximate end 325a of hand-holdable controller 300). For example, an intuitive use of the palming grip may be as an indication of a stop command. Thus, the hand-holdable controller 300 may interpret touch data indicative of a palming and issue a stop command to the computing device 200 or robotic system 100 (or the hand-holdable controller 300 may send the palming touch data to the computing device 200, which in turn sends a command to stop the robotic system 100 from performing an action or to stop an action that the robotic system 100 is currently performing).

In another example of touch input, a partial grip may be interpreted from touch data that indicates a touch gesture somewhere between the grips illustrated in FIGS. 3C and 3D. For example, similar to the full grip show in FIG. 3C, all five fingers of hand 328B of the user may be used to grasp the hand-holdable controller 300 but, for the partial grip, those fingers may be placed closer to the distal end 325b (e.g., above the dividing line 312A of the knob 312 illustrated in FIG. 3B). In the partial grip (although applicable to other grips as well), touch input related to a finger refraction or finger extension may be used to generate touch data. For example, sensors (such as touch sensors 316) may detect a finger retraction (e.g., one or more fingers of hand 328B sliding or moving towards the distal end 325b of hand-holdable controller 300) or a finger extension (e.g., one or more fingers of hand 328B sliding or moving towards the proximate end 325a of hand-holdable controller 300). This finger retraction or extension may vary the commands sent to the robotic system 100. For example, a partial grip plus a finger extension may send control signals of increased magnitude as the fingers extend further. Likewise, a partial grip plus a finger retraction may send control signals of decreased magnitude as the fingers retract further. Other example touch gestures are possible and may be programmable (e.g., via IME 214 or other hardware or software).

Alternatively, a partial grip may be defined in other ways. For example, a partial grip may be defined as a full grip minus one or more pieces of touch input (e.g., touch input indicative of five (or less) fingers with no touch input indicative of a palm on top of knob 324).

In another example of touch input, a finger sequence may be used. For example, touch input indicative of the fingers of hand 328A being placed in a certain sequence may be used to generate touch data. For example, placing the five fingers down in a pattern may be identified and used. For example, a touch input indicative of the user touching the knob 324 first with the thumb and then subsequently with each finger of hand 328a may be used to power the device on or off, or accomplish any other functions. Likewise, any other finger sequence could be identified and used. For example, touch input indicative of a single finger tap (or thumb tap or palm tap) on any touch-sensitive surface could be used. Likewise, touch input related to a swipe could be used. For example, an index finger of hand 328B may be placed on top of knob 324 and swiped in a pattern (e.g., a clockwise pattern) to generate touch data.

Touch gestures can be used in combination to vary the control signals sent to the robotic system 100. For example, a full grip being performed simultaneously with a rotation of the knob 312 may actuate a joint at a high speed. By adding in a touch gesture (e.g., a fingertap) to the full grip and rotation, the control signal may be varied. For example, the speed or magnitude of the control signal may be varied. Similarly, a different component may be controlled by the additional touch gesture (e.g., the fingertap may generate a control signal to close a gripper).

Other examples of touch input that may be used to generate touch data include, for example, a multi-touch (e.g., a combination of touches, such as a full grip followed by a palming, a drag (e.g., an identified grip followed by a dragging motion), a side surface hold (e.g., two fingers of hand 328B placed and held alongside knob 312), and a side surface swipe (e.g., two fingers of hand 328B placed alongside knob 312 and swiped in a clockwise manner). Of course, many other examples of touch input are possible. Also, note that feedback (e.g., vibrational feedback, clicks, detents) could be provided by the controller 300 in response to transitions between such touch inputs.

Figure 4:
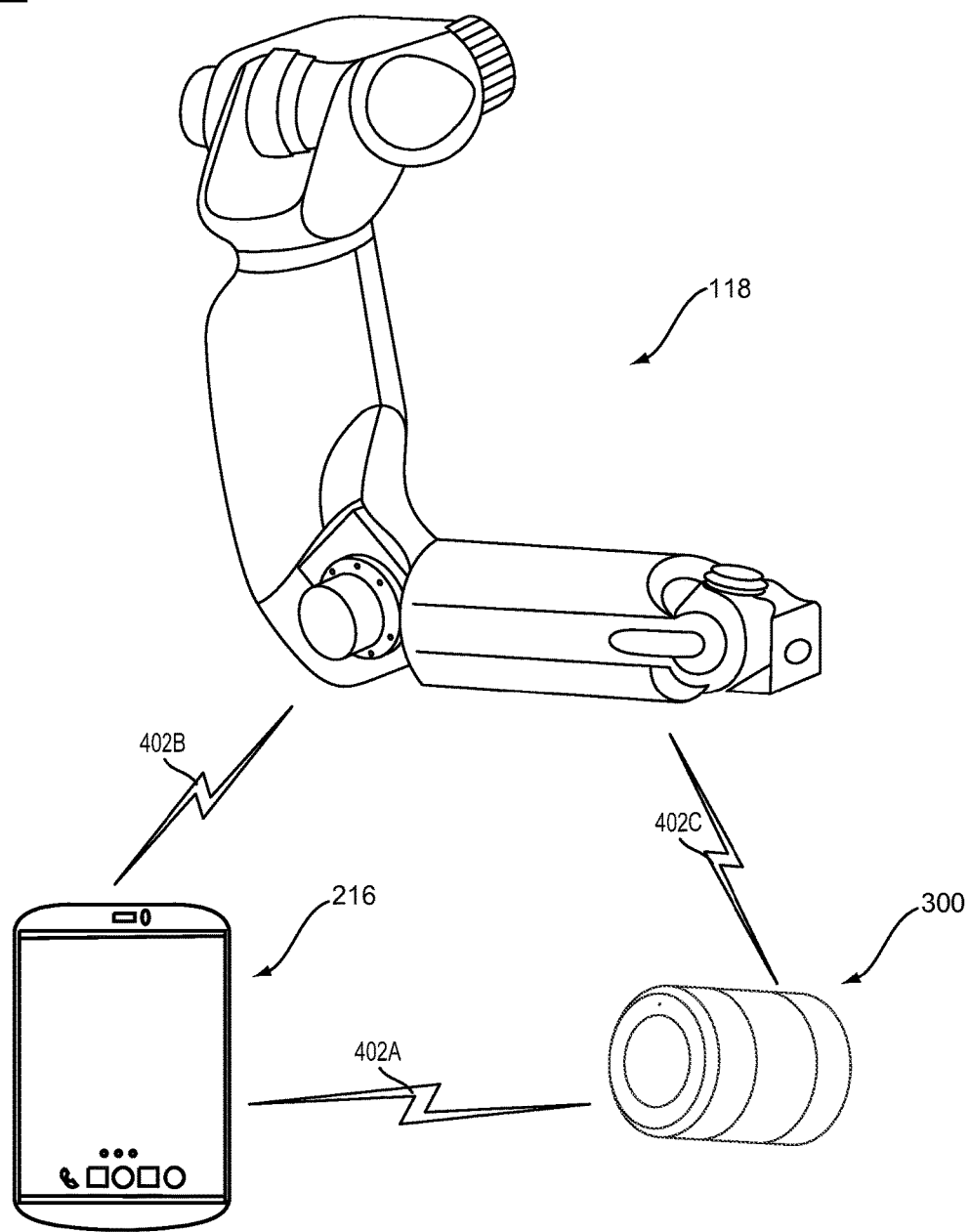
FIG. 4 illustrates example communication links, according to an example implementation.

Robotic system 100, computing device 200, and/or hand-holdable controller 300 may communicate with each other in various ways. To illustrate, refer to FIG. 4 showing an example arrangement 400 including communication links 402A, 402B, and 402C that provide for exchange of information between the various systems. For instance, communication link 402A provides for communication between example hand-holdable controller 320 and tablet 216, communication link 402B provides for communication between tablet 216 and robotic arm 118, and communication link 402C provides for communication between robotic arm 118 and example hand-holdable controller 320. Note that other arrangements may also be possible as some communication links may be removed and other communication links may be added such as for communication with other devices not discussed herein.

Communication links 402A, 402B, and 402C may include wired links and/or wireless links (e.g., using various wireless transmitters and receivers). A wired link may include, for example, a parallel bus or a serial bus such as a Universal Serial Bus (USB). A wireless link may include, for example, Bluetooth, NFC, IEEE 802.11 (IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "WiFi" connectivity using 802.11).

In other examples, the arrangement may include access points through which the various systems may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

In an example implementation, the hand-holdable controller 300 may be configured to receive instructions (e.g., from computing device 200) indicating an operational mode for the hand-holdable controller 300 (e.g., for the rotatable knob 312), so as to essentially load the operational mode onto the controller 300. Such an operational mode may define operational parameters of the motor (e.g., motor 318) of the hand-holdable controller 300. As such, different operational modes may provide different "feels" to the knob by varying the haptic characteristics of the knob 312. In particular, different "feels" can be provided by varying the torque applied to the knob as it rotates and/or otherwise varying when and how torque is applied to the knob 312 and/or by varying the type (or type of control) of motor 318 (e.g., by using a position rotation motor, a continuous rotation motor, a linear motor, etc.).

For example, a given operational mode may specify a specific amount of turning resistance, or in other words, a specific amount of torque that counters rotation by the user (making it harder or easier for the user to turn the knob). In another example, an operational mode may specify a rotationally-varying torque profile, which varies the amount of resistance to turning as the knob rotates. In some embodiments, a positional rotation servomotor may be used where the torque rating of the servomotor at a particular position must be overcome to turn the knob. Other examples are also possible.

In another aspect, a given operational mode may specify a range of rotation to which the knob 312 is restricted. To do so, an operational mode may define the number of degrees of rotation from a base orientation that are permissible in one or two directions. For example, an operational mode may limit rotation to within plus or minus 45 degrees from a center point. Other examples are also possible.

In yet another aspect, a given operational mode may set limits on the speed at which the knob can turn. For instance, a given operational mode may set a maximum or minimum number of degrees per second. Further, in some implementation s, an operational mode may vary the maximum or minimum speed of rotation as a function of the number of degrees the knob has rotated from a base orientation.

In yet another aspect, a given operational mode may indicate whether or not to apply a return-to-center function, which returns the knob to a base orientation when certain conditions are met. For example, a return-to-center function may rotate the knob back to a base orientation whenever input data from the touch sensors on the knob indicates that the user has released the knob. As another example, a return-to-center function may only respond to release of the knob by rotating the knob back to the base orientation in certain orientations of the knob (e.g., when the knob has been rotated by at least some threshold amount from the base orientation, or when the knob has reached a rotation limit).

In yet another aspect, a given operational mode may specify certain orientations or a certain range of rotation during which free spin of the knob should be allowed. In particular, when the knob is put in a free-spin mode, the motor may be disabled such that the knob is allowed to rotate freely about the stator of the motor. An operational mode may also specify certain trigger events that trigger the enabling or disabling of free-spin mode. For example, an operational mode could define a certain touch gesture or gestures that enable and/or disable the free-spin mode. Other examples are also possible.

Other haptic parameters may also be adjusted or set by a given operational mode. For example, the hand-holdable controller may be configured to provide a variable resistance through customizable arc sizes of various sizes. As a specific example, a full (or partial) rotation of the knob could be divided into a variable number of arcs, and each arc could be of various sizes. Each of the variable number of arcs could be defined to have a specific feel (e.g., one or more operational modes, such as resistance levels, speed, detents or no detents, etc.). Other examples are also possible.

In a further aspect, an operational mode may also specify how touch input that is received via a knob controller should be interpreted and/or translated into control signals for a robot system. For example, an operational mode may define one or more touch gestures that are available for use in the operational mode, and how these touch gestures should be interpreted. Various types of touch gestures may be defined and mapped to control functions, depending upon the particular implementation.

In some cases, an operational mode may define one or more touch gestures that can be used to switch from the operational mode to one or more other operational modes. Additionally or alternatively, touch gestures that place a knob controller into a given operational mode may be defined globally, such that the controller can be placed into the given operational mode from any other operational mode. In either case, touch gestures may be used to vary the feel of the knob as it is rotated, and/or to vary manner in which rotation of the knob 312 is interpreted into robot control signals. For instance, control signals sent via rotation of the knob may vary based on different manners in which a user gestures or grasps the knob 312 and/or may vary based on the location of the touch gesture along the one or more surfaces of the knob 312, among other possibilities.

According to an example implementation, the hand-holdable controller 300 may detect a rotation of the control knob (e.g., knob 312), and may indicate that rotation of the knob to the computing device 200. Additionally or alternatively, the hand-holdable controller 300 may provide output data to a controller application running on computing device 200, which is indicative of detected touch data (e.g., during rotation of the knob). As such, the computing device 200 may determine the rotation of the knob 312 and/or touch gestures performed on the knob 312, and may responsively generate corresponding control signals for another device (e.g., robotic system 100) in accordance with the rotation and/or detected touch.

To control a device, such as robotic system 100, the computing device 200 may exchange messages with the robotic system 100 (e.g., via communication link 402B). The messages may include commands that indicate the particular component to which the robotic system 100 should send control signals. The messages may also include commands that indicate the particular operations that should be carried out by the particular component. As discussed, these particular operations are based on an interpretation of the input data received by the computing device 200 from the hand-holdable controller 300.

III. EXAMPLE MOVEABLE MEMBERS

According to various implementations, the above-discussed controller system may also include a moveable member. The moveable member may be coupled to the controller at all times. Alternatively, the moveable member may be attachable to the controller and/or detachable from the controller in one of various ways as further discussed below. Additionally, the moveable member could take on any shape or form. For instance, the moveable member could take the form of a bar, a lever, a pin, a dial, and/or a sleeve, among other possibilities. Further, the moveable member could be composed of any material, such as metal and/or plastic for instance.

Accordingly, the moveable member is adjustable between at least a first position and a second position. In the first position, the moveable member is coupled to the knob 312 such that the moveable member (or at least a portion of the moveable member) extends radially (e.g., perpendicular) to the curved surface of the knob 312, such along a radial axis for instance. In this first position, application of an external force (e.g., any force not generated by the motor of the controller) to the moveable member may cause rotation of the knob 312. By way of example, the force at issue may be substantially perpendicular to the radial axis and may therefore translate to a torque that causes the rotation of the knob. This may allow for a more consistent rotation of the knob relative rotation of the knob resulting from application of a torque (e.g., by the user) directly to the knob 312.

In the second position, the moveable member may provide for accessibility to the curved surface of the knob 312. For instance, the moveable member may be positioned such that a user can grasp onto any surface of the knob 312 without the moveable member being the way of the grasping. Additionally, this position may involve the moveable member being detached from the controller or may involve the moveable member remaining coupled to the controller while providing for the accessibility to the knob 312. In either case, at this second position, application of an external torque (e.g., any torque not generated by the motor of the controller) may cause rotation of the knob 312. That is, in the second position, the moveable member may not prevent the rotation of the knob 312.

In an example arrangement, the moveable member may be mechanically adjustable between the first and second positions in one of various ways. In one case, the moveable member may be adjustable by application of one or more particular external forces directly onto the moveable member. By way of example, a particular external force (e.g. provided by a user) may be applied to the moveable member so as to detach or attach the member to the knob. In another case, the moveable member may be adjustable by application of one or more particular external forces onto another component. By way of example, the controller may include a button and press of the button may result in the adjustment between the first and second positions. In yet another case, the moveable member may be automatically adjusted between the first and second position in response to a particular condition. By way of example, the condition may involve operation of the controller at a particular operational state. Other cases and examples are also possible.

In other arrangements, the moveable member could also be adjusted to other positions as well (e.g., in addition to the first and second positions). Alternatively, the moveable member may not be adjustable and could be at the same position (e.g., the first position) at all times, so as to fulfil the intended purpose of the moveable member at that respective position. Regardless of the arrangement, the motor may be configured to apply torque to the knob at any position of the moveable member. Other arrangements are also possible.

With such arrangements, short linear movement could be provided by a user in the form of user-input. For example, a user could move a finger in a straight line (e.g., tangential to the initial position of the moveable member) so as to cause the moveable member to move a relatively short distance, thereby also rotating the knob 312. This movement could simulate the "feel" of pressing a button (e.g., with the motor applying torque to provide for haptic feedback simulating this "feel"), or other such linear input features. In this manner, the moveable member may allow for receiving linear input at the controller 300 that can be detected by the computing system 200 and then used to determine an operational mode for the controller 300 and/or to determine commands for control of a device (e.g., robotic system 100), among other possibilities. Other advantages to this arrangement are also possible.

Various example implementations of the moveable member will now be introduced to illustrate the above-mentioned first and second positions. Note that the example implementations are discussed for illustration purposes and are not meant to be limiting, as other example implementations may also be possible without departing from the scope of the disclosure.

Figure 5A:
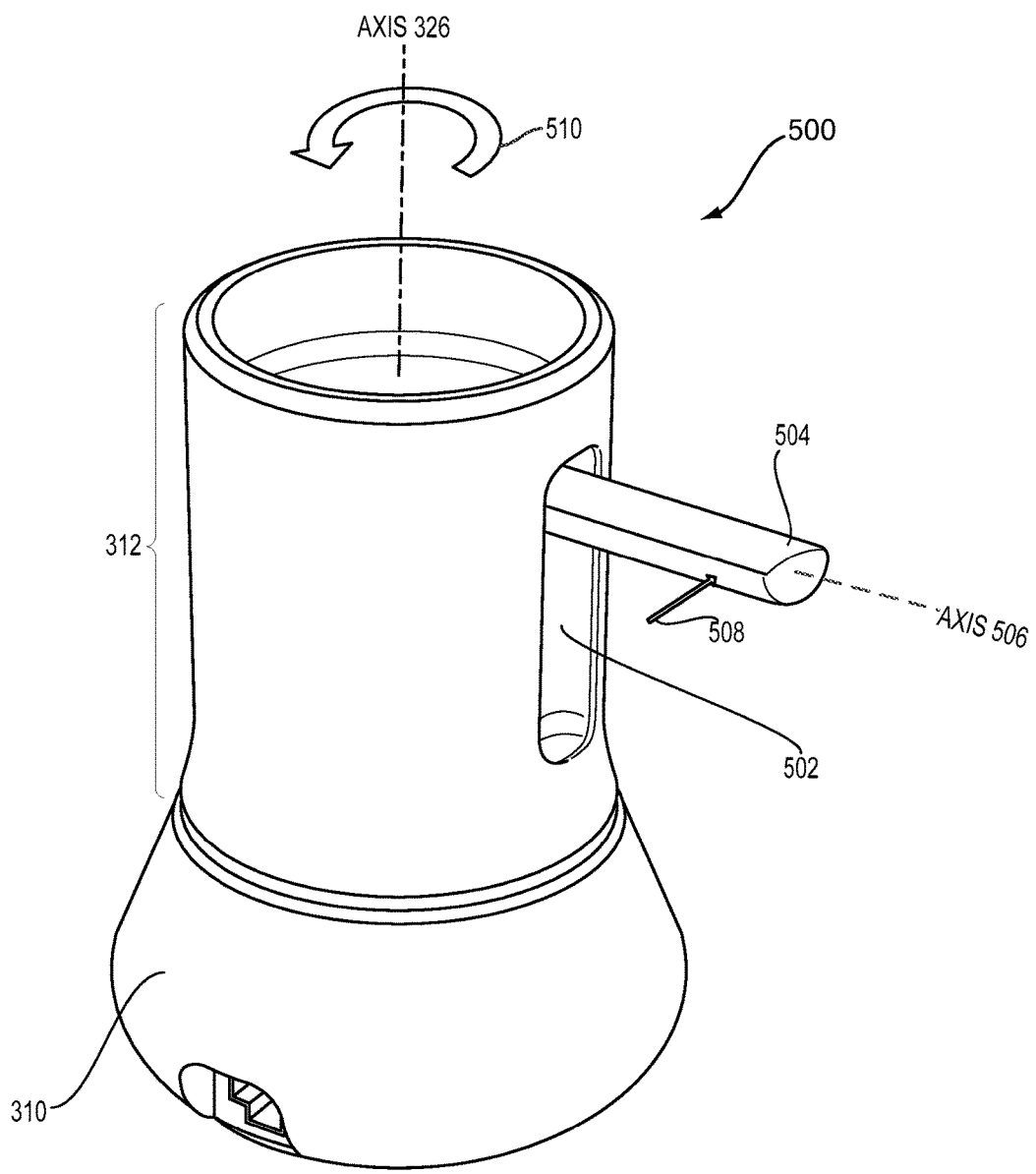
FIGS. 5A, 5B, 6A, 6B, 7A, 7B, 8A, 8B, 9A, 9B, 10A, and 10B illustrate example moveable members, according to example implementations.
Figure 5B:
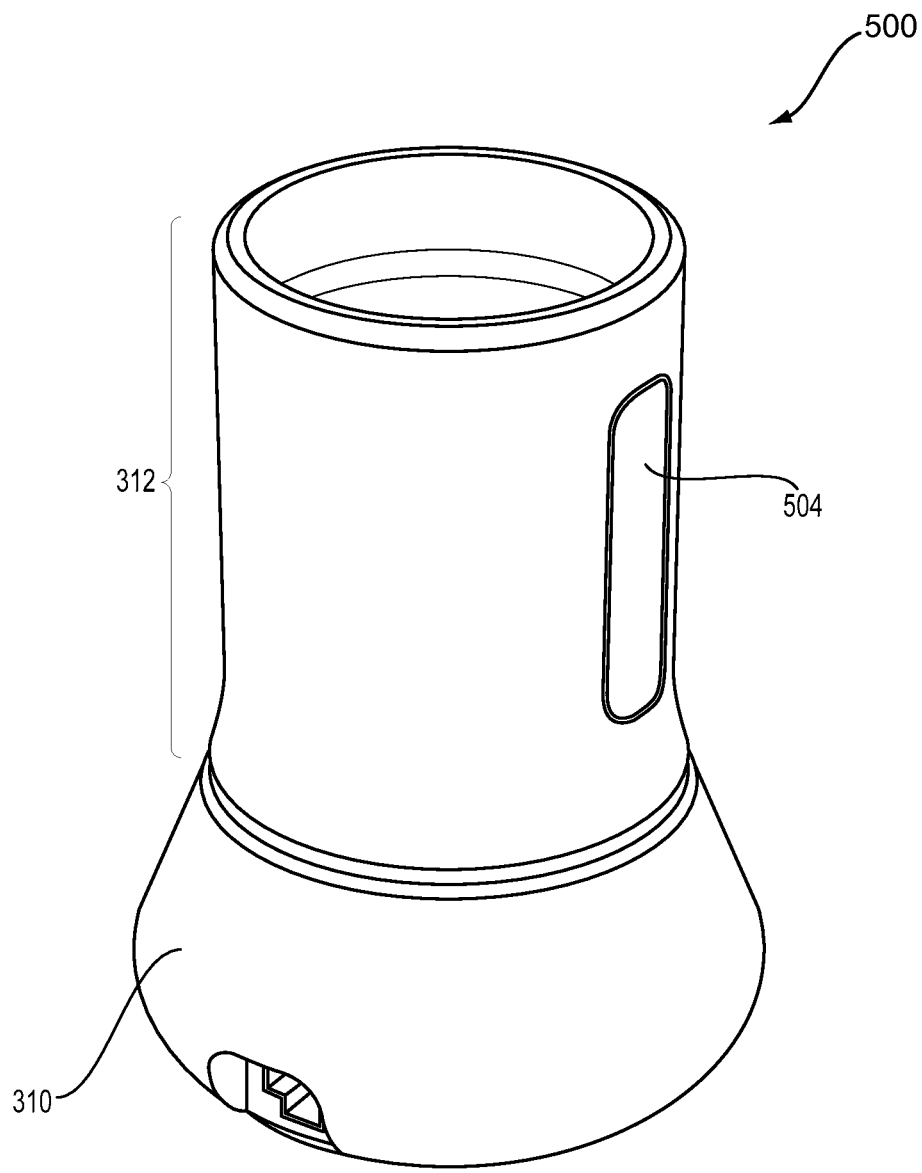

FIGS. 5A-5B illustrate an example controller 500 that includes a knob 312 having a recess 502 formed thereon. This recess 502 can also be referred to as a notch or a cavity and may define an indentation on the surface of the knob 312. This indentation may take on any shape or form, such as a circle or an oval for instance. Additionally, as shown, the example controller 500 includes a moveable member taking the form of a lever 504 coupled to the knob 312. The lever 504 could be coupled to the knob 312 in one of various ways. By way of example, an end of the lever 504 (or any other portion of the lever) could be coupled to the knob 312 by way of a hinge that allows for rotation of the lever 504 about that end.

FIG. 5A shows the lever 504 as positioned in the above-mentioned first position at which the lever 504 extends radially (e.g., perpendicular) to the curved surface of the knob 312, such along a radial axis 506. In this first position, an external force 508 (e.g., perpendicular to the radial axis 506) could be applied to the lever 504. As shown, the external force 508 results in rotation 510 of the knob 312 relative to the base 310, such as rotation 510 about axis 326. While FIG. 5A shows the rotation 510 as corresponding to the direction of the applied external force 508, application of an external force that is opposite to force 508 would result in rotation of the knob 312 in a direction opposite the direction of the rotation 510. In this manner, while the lever 504 is in the first position, various external forces could be applied (e.g., by a user) to the lever 504 that would result in clockwise or counter-clockwise rotation of the knob 312.

FIG. 5B, shows the lever 504 as positioned in the above-mentioned second position at which the lever 504 provides for accessibility to the curved surface of the knob 312. In particular, the lever 504 is shown as adapted onto the recess 502 while the lever 504 is in the second position. In this example implementation, the lever 504 may have a shape that substantially complements the shape of the recess 502, so that the lever 504 does not protrude from the surface of the knob 312 for instance. In this manner, an external torque could be applied (e.g., by a user) directly onto the knob 312 without the lever 504 being in the way of application of this external torque.

Moreover, the lever 504 may include at least one surface having a curvature that is substantially the same as curvature of the curved surface of the knob 312. For instance, this surface may be the outside surface of the lever 504 that is visible while the lever 504 is adapted onto the recess 502. In this example implementation, the outside surface of the lever 504 and the curved surface of the knob 312 may collectively form a continuous surface while the lever 504 is adapted onto the recess 502. More specifically, this continuous surface may form due to the substantially similar curvatures of the surfaces at issue and may thus allow for a user to grasp onto the knob 312 such that the user can carry out (and/or transition between) various gestures (and/or rotation of the knob 312) without the presence of the lever 504 (or the recess 502) being in the way of the grasping. Other examples are also possible.

Figure 6A:
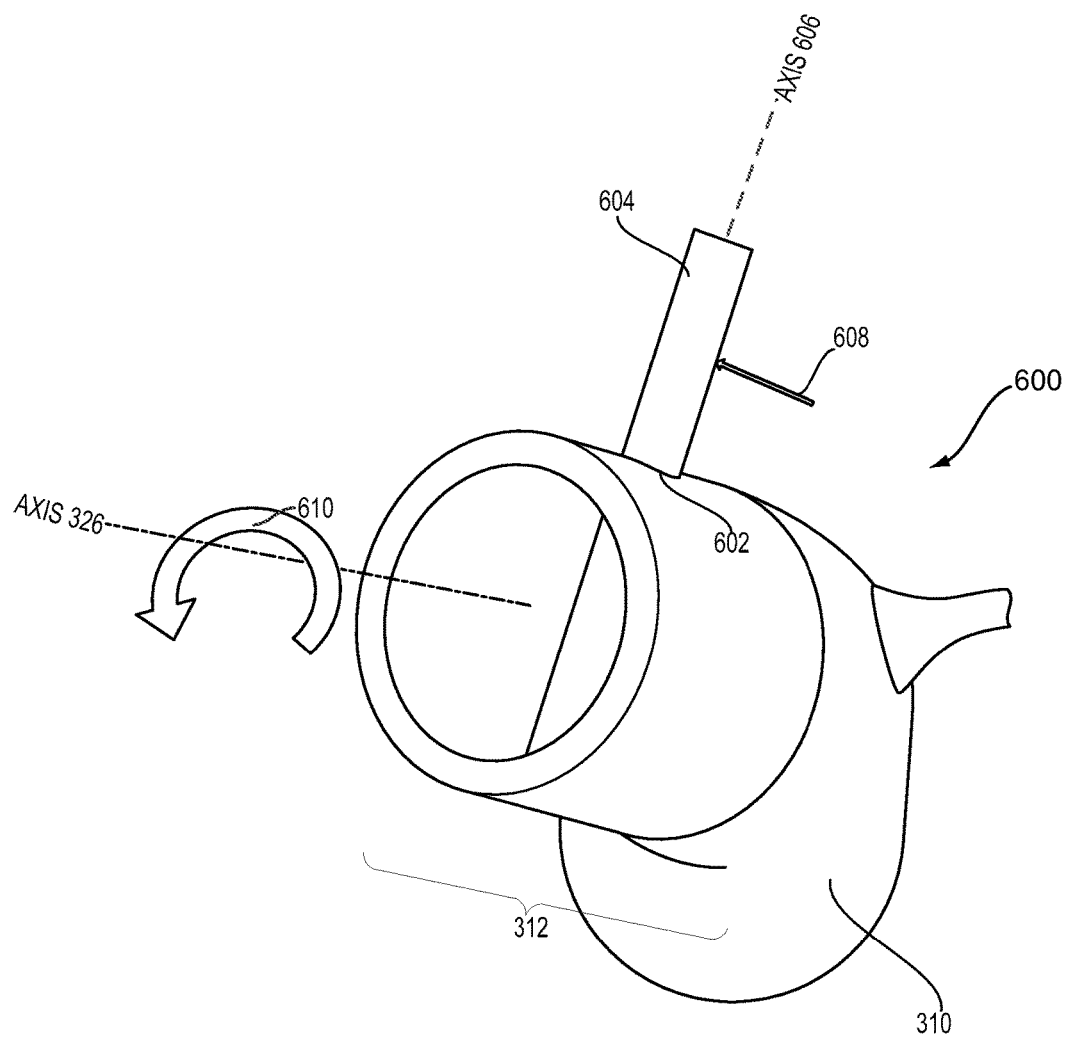
Figure 6B:
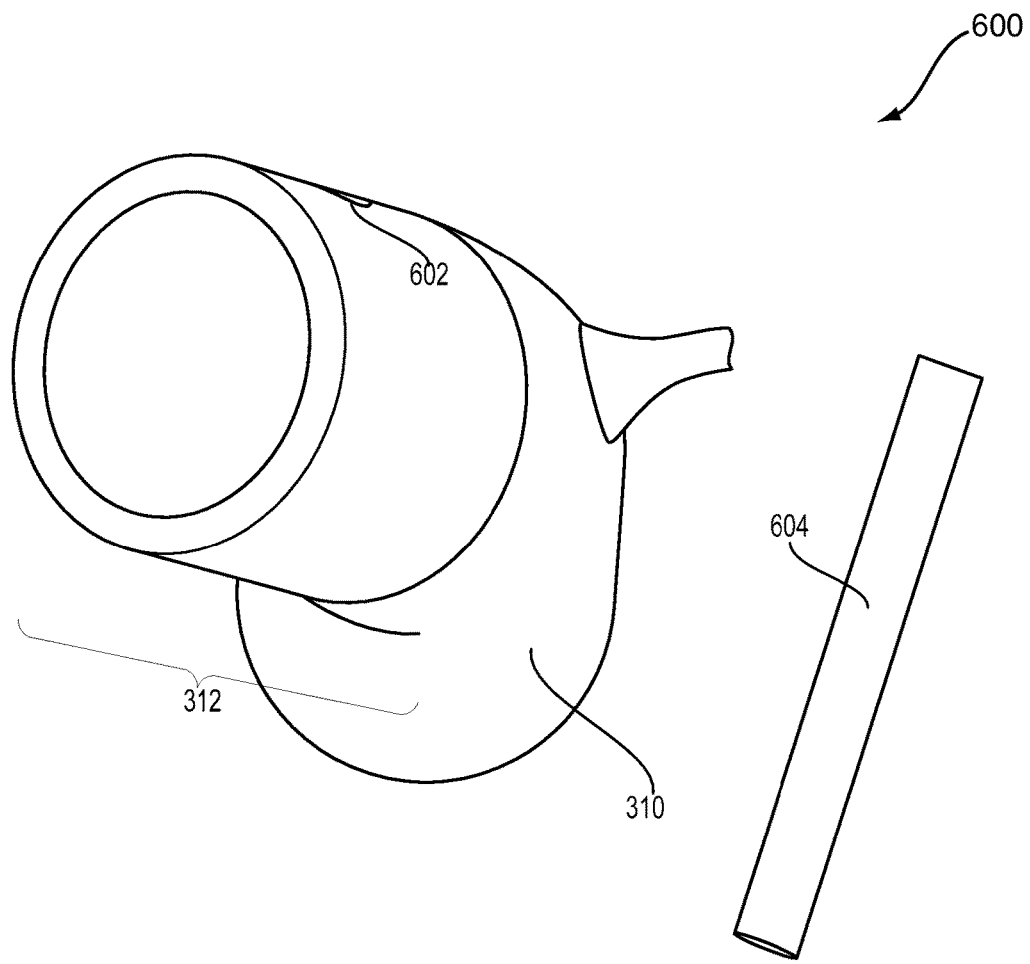

FIGS. 6A and 6B illustrate an example controller 600 that includes a knob 312 (e.g., a hollow knob) having a hole 602 formed thereon. This hole 602 may take on any shape or form, such as a circle or a square for instance. Additionally, as shown, a moveable member may take the form of a bar 604 (could also be a pin) that is insertable into the hole 602 and is removable from the hole 602 (i.e., after being inserted into the hole 602). The bar 604 may include at least one cross section having a shape that substantially matches the shape of the hole 602. For instance, the hole 602 may take the form of a circle having a particular radius and the cross section at issue may be a circle having the same or a similar radius. Other instances are also possible.

FIG. 6A shows the bar 604 as positioned in the above-mentioned first position at which the bar 604 is inserted into the hole 602 and extends radially (e.g., perpendicular) to the curved surface of the knob 312, such along a radial axis 606. In this first position, an external force 608 (e.g., perpendicular to the radial axis 606) could be applied to the bar 604. As shown, the external force 608 results in rotation 610 of the knob 312 relative to the base 310, such as rotation 610 about axis 326. While FIG. 6A shows the rotation 610 as corresponding to the direction of the applied external force 608, application of an external force that is opposite to force 608 would result in rotation of the knob 312 in a direction opposite the direction of the rotation 610. In this manner, while the bar 604 is inserted into the hole 602 at the first position, various external forces could be applied (e.g., by a user) to the bar 604 that would result in clockwise or counter-clockwise rotation of the knob 312.

When the bar 604 is inserted into the hole 602, the bar 604 may be relatively stable while positioned in the hole 602 and/or while the external force 608 is applied. In some cases, however, the interior of the knob 312 (e.g., an interior surface) may include a mechanism to which an end of the bar 604 (or another portion of the bar 604) could be coupled (and decoupled), so as to increase the stability. This mechanism could be latch, a bulge formed on the interior surface, and/or an additional hole (as further discussed below), among other possibilities. In either case, this mechanism may increase stability of the bar 604 while it is inserted in the hole 602 at the first position and/or while the external force 608 is applied.

FIG. 6B shows the bar 604 as positioned in the above-mentioned second position at which the bar 604 is removed from the hole 602, thereby providing for accessibility to the curved surface of the knob 312. Additionally, once the bar 604 has been removed, the bar 604 could be positioned at any location in physical space that is away from the example controller 600. In this manner, an external torque could be applied (e.g., by a user) directly onto the knob 312 without the bar 604 being in the way of application of this external torque. Other examples are also possible.

Figure 7A:
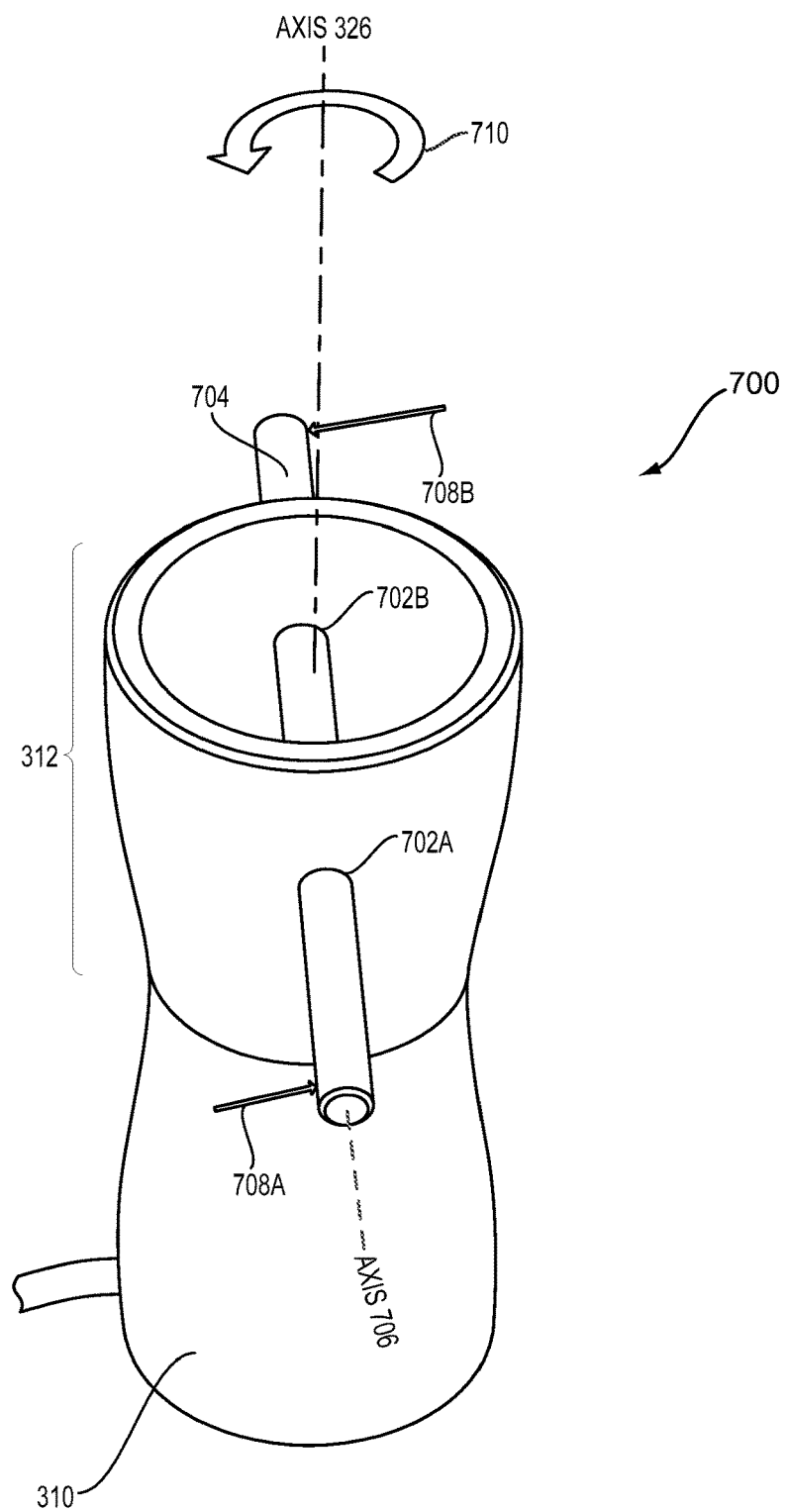
Figure 7B:
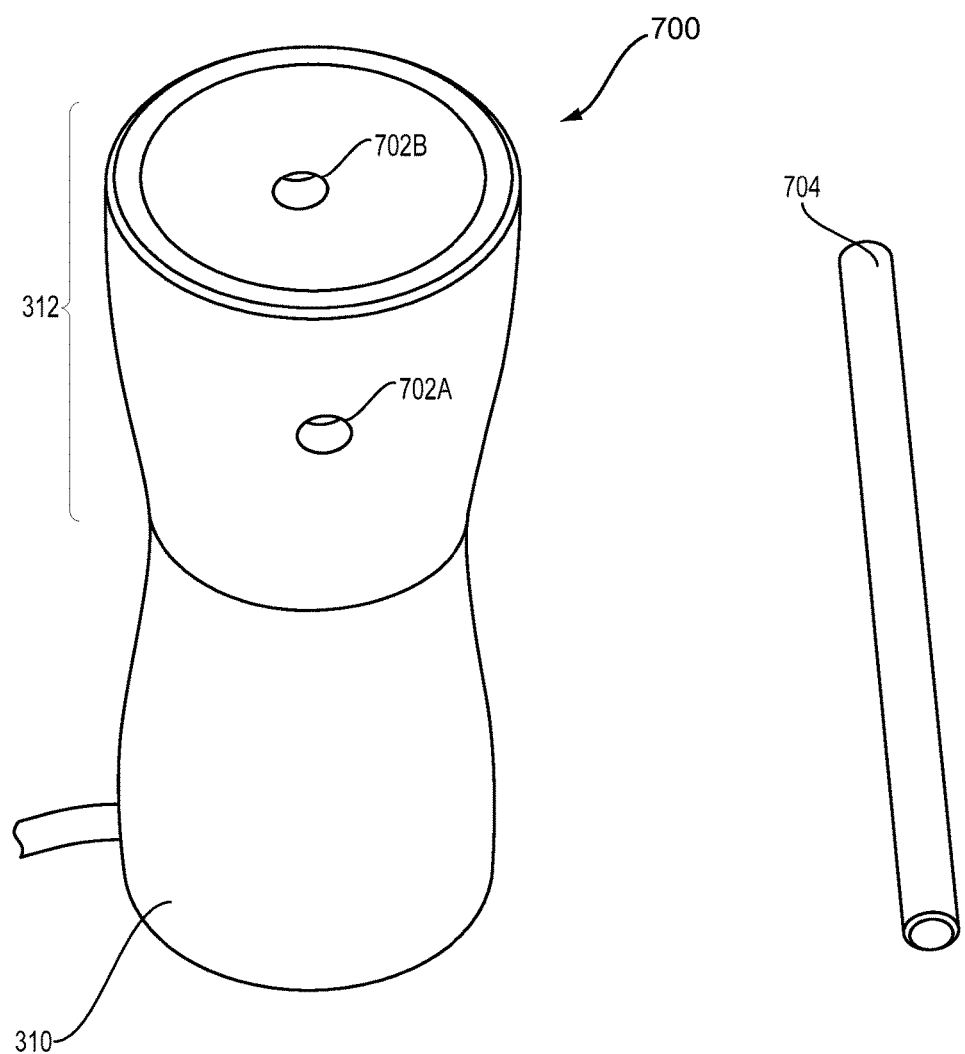

FIGS. 7A and 7B illustrate an example controller 700 that includes a knob 312 (e.g., a hollow knob) having a first hole 702A formed thereon and a second hole 702B formed thereon at an end of the knob 312 (e.g., of the curved surface of the knob 3012) that is opposite to the first hole 702A. The holes 702A-702B may take on any shape or form, such as a circle or a square for instance. More specifically, both holes 702A-702B may take on the same shape/form or each holes 702A-702B may take on a different shape/form. Note that additional holes are possible without departing from the scope of the disclosure.

Additionally, as shown, a moveable member may take the form of a bar 704 (such as the bar 604 discussed above) that is insertable into the first and second holes 702A-702B and is removable from the first and second hole 702A-702B (i.e., after being inserted into the holes 702A-702B). The bar 704 may include at least one cross section having a shape that substantially matches the shape of the first and second holes 702A-702B. For instance, the first and second holes 702A-702B may both take the form of a circle having a particular radius and the cross section at issue may be a circle having the same or a similar radius. Other instances are also possible.

FIG. 7A shows the bar 704 as positioned in the above-mentioned first position at which the bar 704 is inserted into the first and second holes 702A-702B and extends radially (e.g., perpendicular) to the curved surface of the knob 312, such along a radial axis 706. In this first position, an external force 708A and/or an external force 708B (e.g., perpendicular to the radial axis 606) could be applied to the bar 704. With this arrangement, an external force could be applied at either portion of the bar 704 that protrudes from the curved surface of the knob 312. Alternatively, with this arrangement, external forces could be simultaneously applied at both portions of the bar 704 that protrude from the curved surface of the knob 312, so as to increase the applied force for instance. Other cases are also possible.

As shown, such external forces 708A-708B result in rotation 710 of the knob 312 relative to the base 310, such as rotation 710 about axis 326. While FIG. 7A shows the rotation 710 as corresponding to the direction of the applied external forces 708A-708B, application of external forces that are respectively opposite to forces 708A-708B would result in rotation of the knob 312 in a direction opposite the direction of the rotation 710. In this manner, while the bar 704 is inserted into the first and second holes 702A-702B at the first position, various external forces could be applied (e.g., by a user) to the bar 704 that would result in clockwise or counter-clockwise rotation of the knob 312.

FIG. 7B shows the bar 704 as positioned in the above-mentioned second position at which the bar 704 is removed from the first and second holes 702A-702B, thereby providing for accessibility to the curved surface of the knob 312. Additionally, once the bar 704 has been removed, the bar 704 could be positioned at any location in physical space that is away from the example controller 700. In this manner, an external torque could be applied (e.g., by a user) directly onto the knob 312 without the bar 704 being in the way of application of this external torque. Other examples are also possible.

Figure 8A:
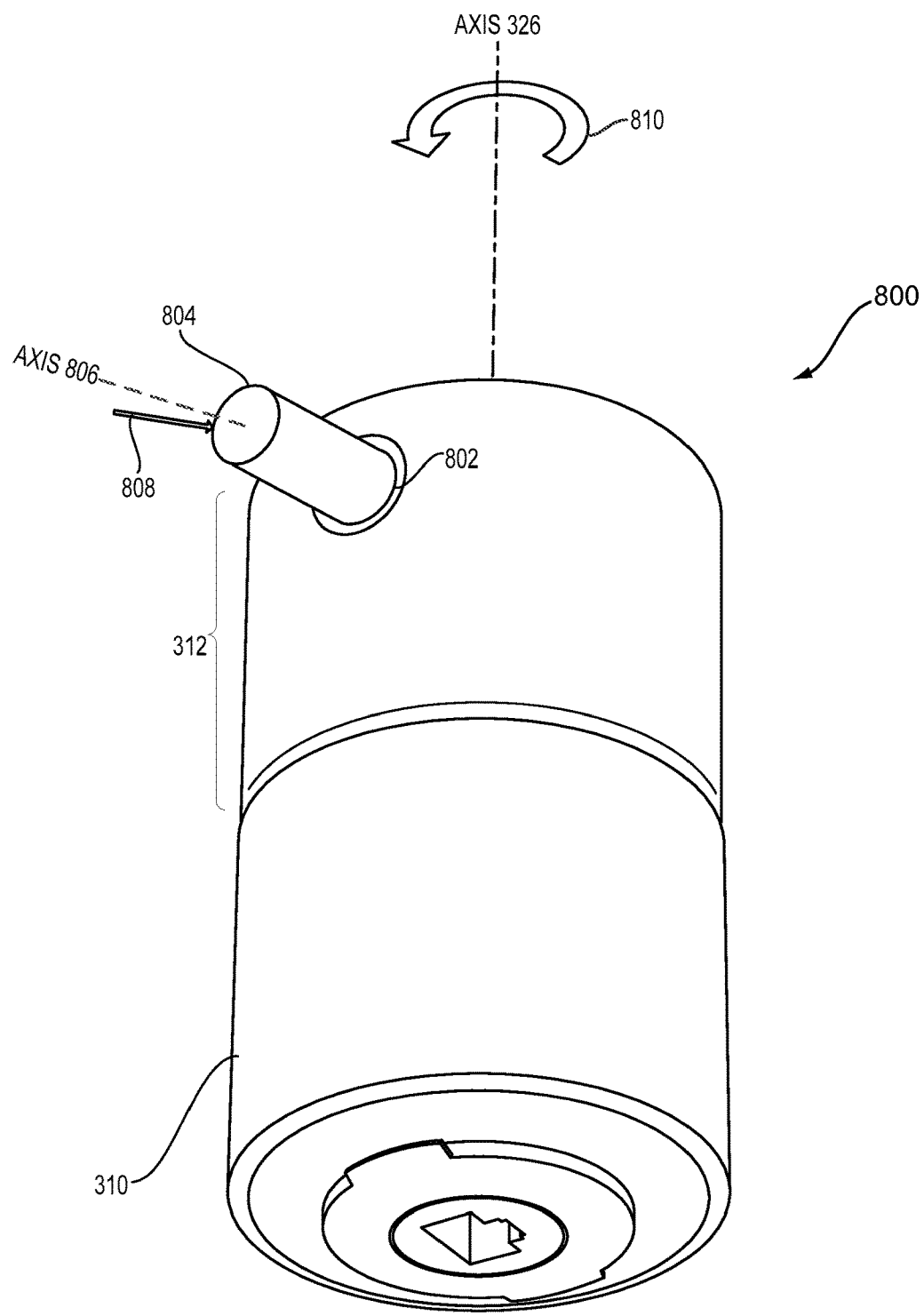
Figure 8B:
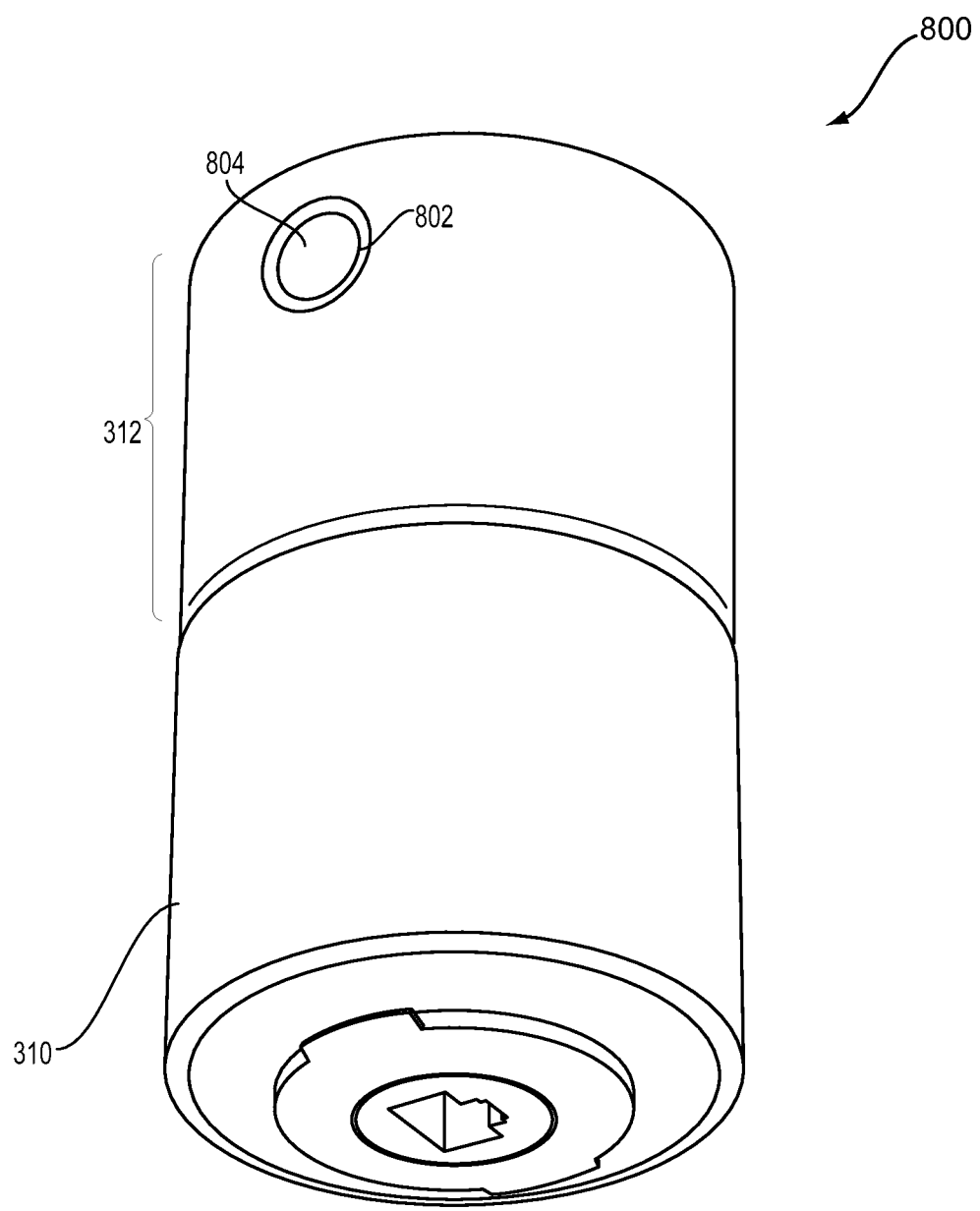

FIGS. 8A and 8B illustrate an example controller 800 that includes a knob 312 having a hole 802 formed thereon. This hole 802 may take on any shape or form, such as a circle or a square for instance. Additionally, as shown, a moveable member may take the form of a bar 804 (could also be a pin) that is inserted into the hole 802 and is therefore coupled to the curved surface of the knob 312 by way of slidably engaging the hole 802. With this arrangement, the bar 804 may constantly engage the hole 802 without being removable from the hole 802. In other arrangements, however, the bar 804 may be removable from the hole 802 and insertable into the hole 802. In either case, the bar 804 may include at least one cross section having a shape that substantially matches the shape of the hole 802. For instance, the hole 802 may take the form of a circle having a particular radius and the cross section at issue may be circle having the same or a similar radius. Other instances are also possible.

FIG. 8A shows the bar 804 as positioned in the above-mentioned first position at which the bar 804 slidably engages the hole 802 and extends radially (e.g., perpendicular) to the curved surface of the knob 312, such along a radial axis 806. More specifically, the bar 804 slidable engages the hole 802 such that the bar 804 protrudes from the curved surface of the knob 312 by some amount (e.g., a first amount). In this first position, an external force 808 (e.g., perpendicular to the radial axis 806) could be applied to the bar 804. As shown, the external force 808 results in rotation 810 of the knob 312 relative to the base 310, such as rotation 810 about axis 326.

While FIG. 8A shows the rotation 810 as corresponding to the direction of the applied external force 808, application of an external force that is opposite to force 808 would result in rotation of the knob 312 in a direction opposite the direction of the rotation 810. In this manner, while the bar 804 slidably engages the hole 602 (and protrudes the curved surface by the first amount) at the first position, various external forces could be applied (e.g., by a user) to the bar 804 that would result in clockwise or counter-clockwise rotation of the knob 312.

FIG. 8B shows the bar 804 as positioned in the above-mentioned second position. In particular, in this implementation the bar 804 is slidably engages the hole 802 such that the bar 804 protrudes from the curved surface of the knob 312 by a second amount that is less than the above-mentioned first amount, thereby providing for accessibility to the curved surface of the knob 312. In some cases, this second amount may be a substantially zero amount, such that the bar 804 does not protrude from the curved surface of the knob 312 by any amount for instance. In this manner, an external torque could be applied (e.g., by a user) directly onto the knob 312 without the bar 804 being in the way of application of this external torque.

In a further aspect, adjustability between the first and second positions in this implementation could take on one of various forms. For example, adjusting from the first position to the second position may involve application of an external force to the bar 804 along axis 806 (e.g., in the direction towards the curved surface). In this example, the controller 800 may have any type of latch system (not shown) capable of fixing ("latching onto") the bar 804 at the second position once a sufficient external force has been applied to move the bar 804 to the second position from the first position.

In some cases, this sufficient external force may involve moving the bar 804 to a particular position where the bar 804 protrudes from the curved surface by an amount that is less than the above-mentioned second amount (e.g. a negative amount). Once the sufficient external force is removed (e.g., no longer applied), the bar 804 may slidably engage the hole 802 so as to move to the second position at which the latch system fixes the bar 804. This move to the second position may be due to a spring that is coupled to the controller 800 and/or to the bar 804 and is arranged to essentially push the bar 804 to the relevant position.

Further, in this example, adjusting from the second position to the first position may also involve application of an external force to the bar 804 along axis 806 (e.g., in the direction towards the curved surface). This external force may be the same as or different from the external force noted above in relation to adjustability from the first position to the second position. In either case, the external force at issue may cause the latch system to release the bar 804 such that the bar 804 can move to the first position. Once the external force at issue is removed (e.g., no longer applied), the bar 804 may slidably engage the hole 802 so as to move to the first position at which the bar 804 protrudes from the surface by the first amount. This move to the first position may be due to the above-mentioned spring that is coupled the controller 800 and/or the bar 804 and is arranged to essentially push the bar 804 to the relevant position.

With this arrangement, the bar 804 is essentially adjustable between the first and second positions by way of a "push-push mechanism". That is, a user may "press" on the bar 804 in the direction of the knob 312 so as to position the bar 804 in the first position, thereby allowing the user to use the bar 804 to cause rotation 810 of the knob 312. Similarly, the user may "press" on the bar 804 in the direction of the knob 312 so as to position the bar 804 in the second position, thereby providing accessibility to the curved surface and allowing the user to grasp onto the knob 312 so as to cause rotation of the knob 312 and/or perform one or more touch gestures. Variations to this example are possible and other examples are also possible.

Figure 9A:
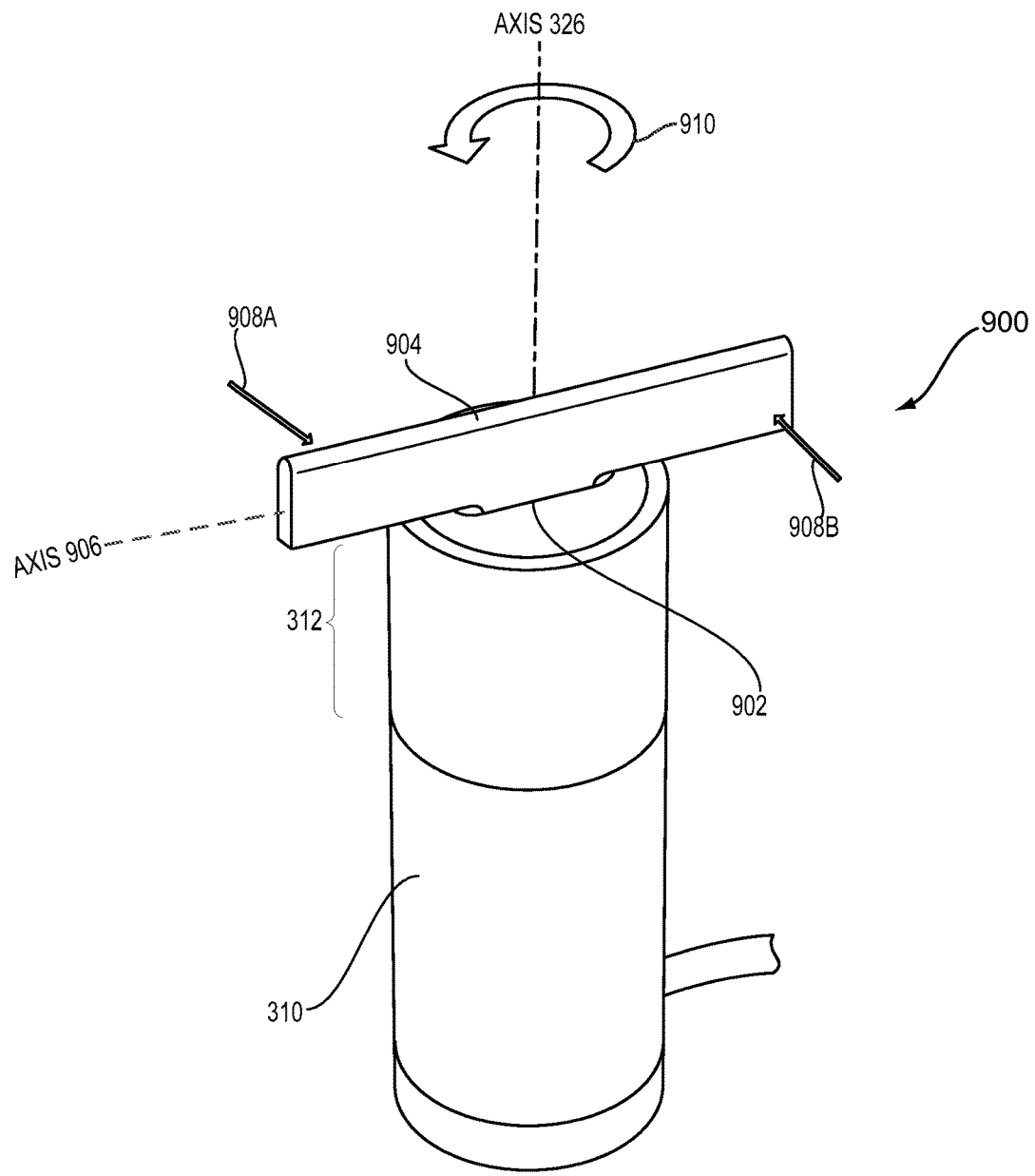
Figure 9B:
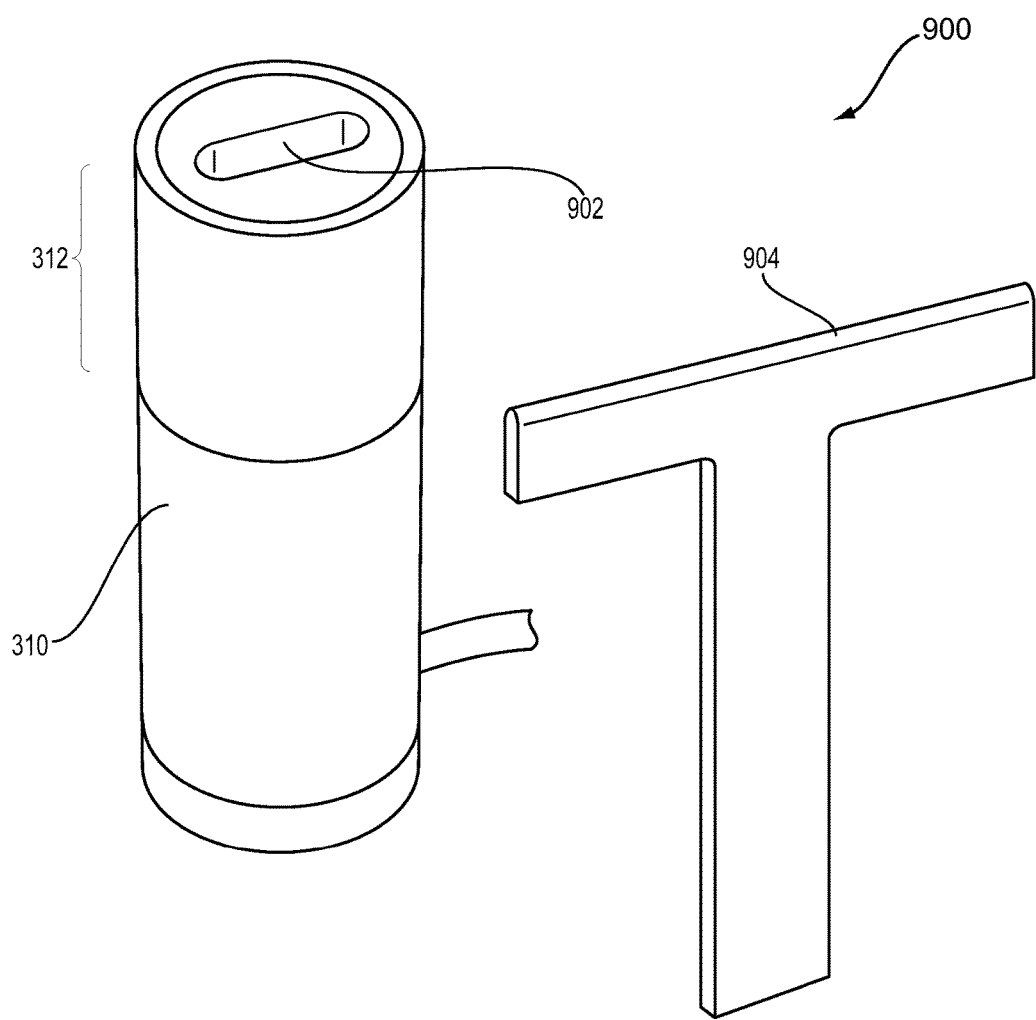

FIGS. 9A and 9B illustrate an example controller 900 that includes a knob 312 having a channel 902 formed thereon. This channel 902 may take on any shape or form, such as an oval or a square for instance. Additionally, as shown, a moveable member may take the form of a bar 904 (such as a T-shaped bar or other shapes) having at least one element that is insertable into the channel 902 and is removable from the channel 902 (i.e., after being inserted into the channel 902). The at least one element of the bar 904 may include cross section having a shape that substantially matches the shape of the channel 902, so as to form a lock-key type of arrangement. For instance, the channel 902 may take the form of a square having a particular size and the cross section at issue may be square having the same or a similar size. Other instances are also possible.

FIG. 9A shows the bar 904 as positioned in the above-mentioned first position at which the at least one element of bar 904 is keyed onto the channel 904 by way of a sliding engagement and at least one other element of the bar 904 extends radially (e.g., perpendicular) to the curved surface of the knob 312, such along a radial axis 906. In this first position, an external force 908A and/or an external force 908B (e.g., perpendicular to the radial axis 906) could be applied to the bar 904. With this arrangement, an external force could be applied at either portion of the bar 904 that protrudes from the curved surface of the knob 312. Alternatively, with this arrangement, external forces could be simultaneously applied at both portions of the bar 904 that protrude from the curved surface of the knob 312, so as to increase the applied force for instance. Other cases are also possible.

As shown, such external forces 908A-908B results in rotation 910 of the knob 312 relative to the base 310, such as rotation 910 about axis 326. While FIG. 9A shows the rotation 910 as corresponding to the direction of the applied external forces 908A-908B, application of external forces that are respectively opposite to forces 908A-908B would result in rotation of the knob 312 in a direction opposite the direction of the rotation 910. In this manner, while the bar 904 is inserted into the channel 902 at the first position, various external forces could be applied (e.g., by a user) to the bar 904 that would result in clockwise or counter-clockwise rotation of the knob 312.

FIG. 9B shows the bar 904 as positioned in the above-mentioned second position at which the bar 904 is removed (e.g., detached) from the channel 902, thereby providing for accessibility to the curved surface of the knob 312. Additionally, once the bar 904 has been removed, the bar 904 could be positioned at any location in physical space that is away from the example controller 900. In this manner, an external torque could be applied (e.g., by a user) directly onto the knob 312 without the bar 904 being in the way of application of this external torque. Other examples are also possible.

Figure 10A:
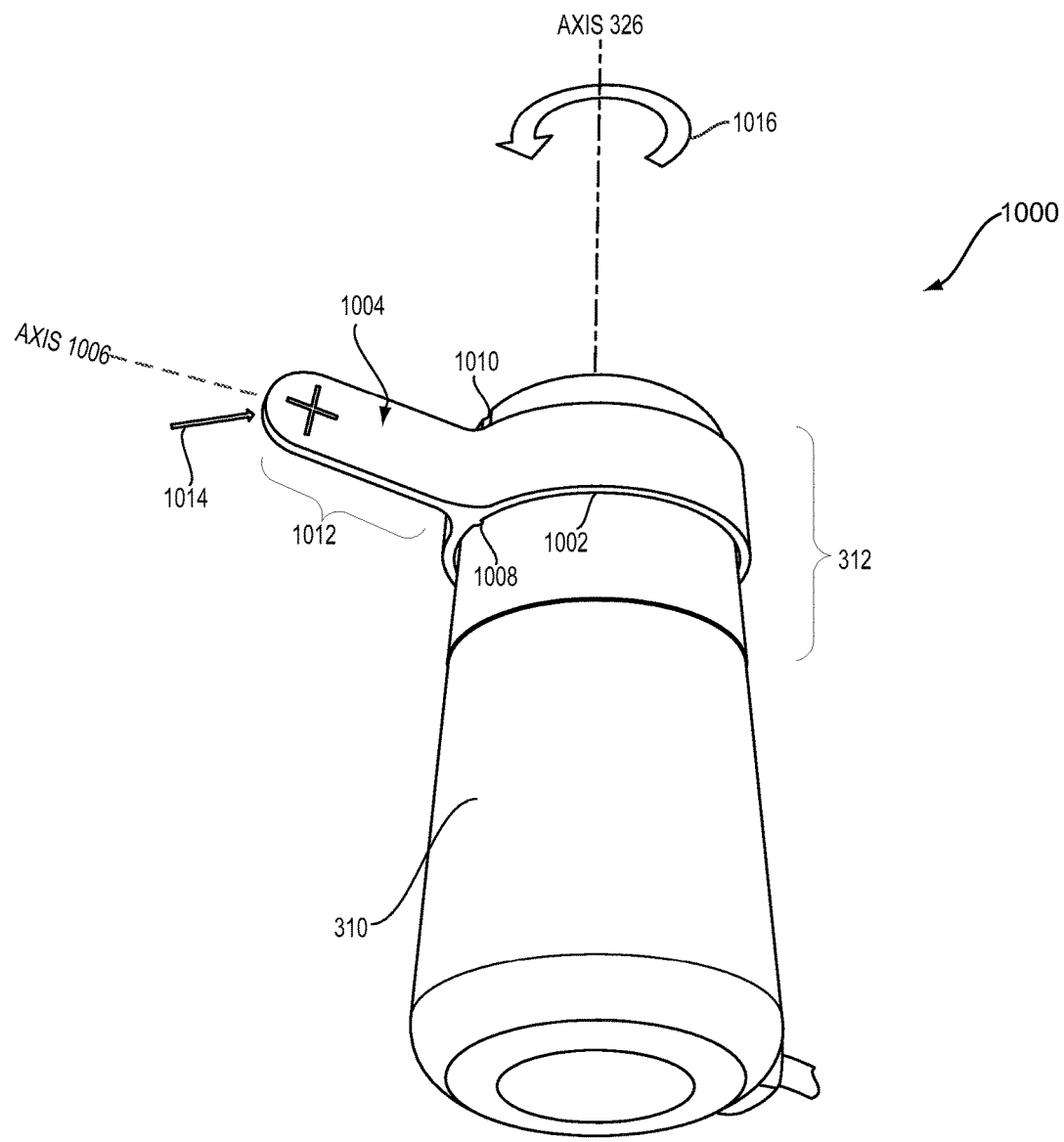
Figure 10B:
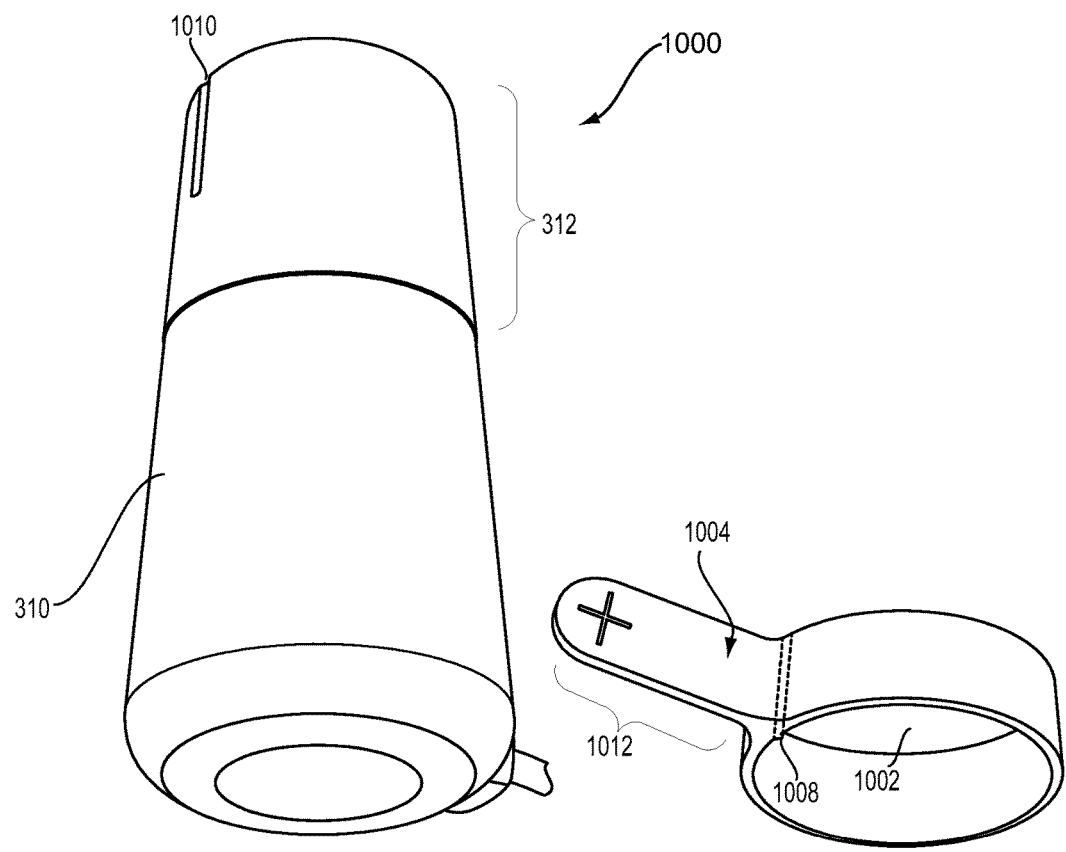

FIGS. 10A and 10B illustrate an example controller 1000 that includes a knob 312 having an indentation 1010 (may also be referred to as a notch or a cavity, among others) formed thereon. This indentation 1010 may take on any shape or form, such as a line or a circle for instance. Additionally, as shown, a moveable member may take the form of a bar 1004 having a hole 1002 (may also be referred to as a channel) onto which the knob 312 could be inserted and from which the knob 312 could be removed. The knob 312 may include at least one cross section having a shape that substantially matches the shape of the hole 1002. For instance, the hole 1002 may take the form of a circle having a particular radius and the cross section at issue may be a circle having the same or a similar radius. Other instances are also possible.

In a further aspect, the bar 1004 may also include a bulge 1008 (could also be referred to as a bump or a protruding portion, among others) that substantially complements the indentation 1010 of the knob 312. With this arrangement, inserting the knob 312 into the hole 1002 (or sliding the bar 1004 over the knob 312) would also involve inserting the bulge 1008 into the indentation 1010 such that the bar 1004 properly engages the knob 312. In an alternative arrangement, however, the bar 1004 may include an indentation (such as indentation 1010) and the knob 312 may include a bulge (such as bulge 1008) so as to result in this proper engagement. In either arrangement, this proper engagement may substantially prevent the bar 1004 from sliding (e.g., rotating) relative to the knob 312 and would thus allow movement (e.g. rotation) of the bar 1004 to cause movement (e.g. rotation) of the knob 312. Other arrangements are also possible.

FIG. 10A shows the bar 1004 as positioned in the above-mentioned first position at which the knob 312 slidably engages the bar 1004 and is keyed onto the hole 1002 by way of the above-mentioned proper engagement. Additionally, in this implementation, the bar 1004 may have at least one element 1012 that extends radially (e.g., perpendicular) to the curved surface of the knob 312, such along a radial axis 1006. In this first position, an external force 1014 (e.g., perpendicular to the radial axis 1006) could be applied to the least one element 1012 of the bar 1004. As shown, the external force 1014 results in rotation 1016 of the knob 312 relative to the base 310, such as rotation 1016 about axis 326.

While FIG. 10A shows the rotation 1016 as corresponding to the direction of the applied external force 1014, application of an external force that is opposite to force 1014 would result in rotation of the knob 312 in a direction opposite the direction of the rotation 1016. In this manner, while the knob 312 is keyed onto the hole 1002 at the first position, various external forces could be applied (e.g., by a user) to the bar 1004 that would result in clockwise or counter-clockwise rotation of the knob 312.

FIG. 10B shows the bar 1004 as positioned in the above-mentioned second position at which the bar 1004 is removed from the knob 312, thereby providing for accessibility to the curved surface of the knob 312. Additionally, once the bar 1004 has been removed, the bar 1004 could be positioned at any location in physical space that is away from the example controller 1000. In this manner, an external torque could be applied (e.g., by a user) directly onto the knob 312 without the bar 1004 being in the way of application of this external torque. Other examples are also possible.

VI. ADDITIONAL FEATURES

Figure 11:
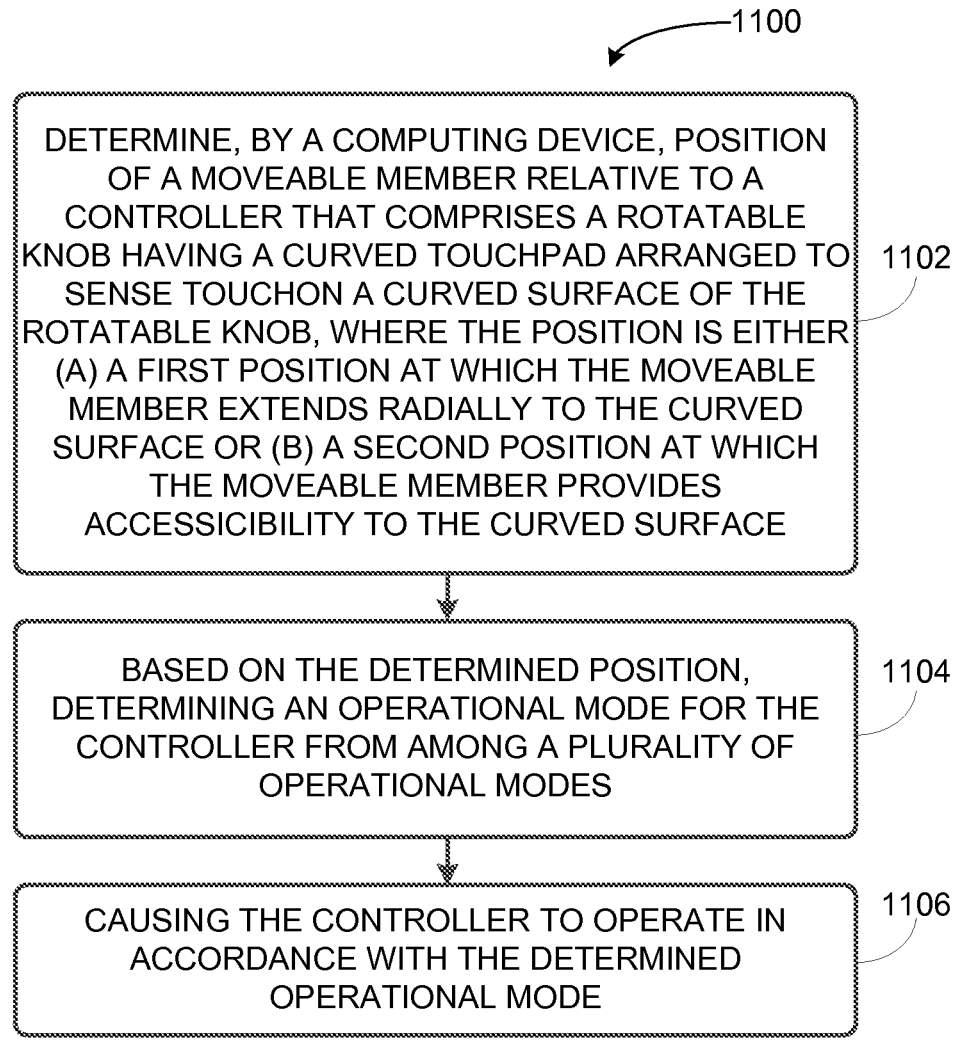
FIG. 11 an example flowchart for determining an operational mode for the example hand-holdable controller, according to an example implementation.

FIG. 11 is a flowchart illustrating a method 1100, according to an example implementation. In particular, method 1100 may be implemented to determine an operational mode for the controller based on position of the moveable member.

Method 1100 shown in FIG. 11 (and other processes and methods disclosed herein) presents a method that can be implemented within an arrangement involving, for example, the robotic system 100, the robotic arm 118, the computing device 200, tablet 216, controller 300, and/or within the arrangement 400 shown in FIG. 4 (or more particularly by one or more components or subsystems thereof, such as by a processor and a non-transitory computer-readable medium having instructions that are executable to cause the device to perform functions described herein). Additionally or alternatively, method 1100 may be implemented within any other arrangements and systems.

Method 1100 and other processes and methods disclosed herein may include one or more operations, functions, or actions as illustrated by one or more of blocks 1102-1106. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 1100 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 1100 and other processes and methods disclosed herein, each block in FIG. 5 may represent circuitry that is wired to perform the specific logical functions in the process.

At block 1102, method 1100 involves determining, by a computing device, position of a moveable member relative to a controller that includes a rotatable knob having a curved touchpad arranged to sense touch on a curved surface of the rotatable knob, where the position is either (a) a first position at which the moveable member extends radially to the curved surface or (b) a second position at which the moveable member provides accessibility to the curved surface.

In an example implementation, the computing device 200 could determine the position of the moveable member in one of various ways. In one example, the controller 300 could report to the computing device 200 the position of the moveable member once the moveable member has been adjusted to the respective position. For instance, the example controller 500 could detect when the lever 504 has been adapted onto the recess 502 and responsive to this detection the controller 500 may report the position of the lever 504 to computing device 200. In another example, the controller 300 could be arranged to continuously (or from time-to-time) report to the computing device 200 the position of the moveable member. In yet another example, the computing device could be arranged to continuously (or from time-to-time) request from the controller 300 the position of the moveable member, and the controller 300 may send the relevant information in response to such request. Other examples are also possible.

At block 1104, method 1100 next involves, based on the determined position, determining an operational mode for the controller from among a plurality of operational modes. And at block 1106, method 110 then involves causing the controller to operate in accordance with the determined operational mode.

In an example implementation, the computing device 200 may determine an operating mode for the controller 300 based on the determined position of the moveable member and perhaps also based on other factors. By way of example, the computing device 200 may do so by referring to mapping data that correlates each of position of the moveable member with a respective operational mode for the controller 300 and then selecting the operational mode based on the mapping data. Once the operational mode has been selected, the computing device 200 may cause the controller 300 to operate in accordance with the selected operational mode, such as by transmitting to the controller 300 a command indicating to do so.

Causing the controller 300 to operate in accordance with the determined operational mode may have one of various outcomes. For instance, the operational mode may cause the controller 300 to operate the motor 318 based on the position of the moveable member. In particular, the motor 318 may affect rotation of the knob 312 (e.g., apply a torque to the knob 312) in different ways depending on the position of the moveable member. By way of example, the motor 318 may apply a higher torque when the moveable member is in the first position relative to a torque that would be applied when the moveable member is in the second position (or vice versa). Other examples are also possible.

As noted above, the controller 300 could include a curved touchpad (e.g., touch sensors 316) arranged to detect touch on the curved surface of the knob 312. In some implementations, the controller system may also include a different touchpad arranged to sense touch on the moveable member. In this implementation, the determined operational mode may involve activating or deactivating the respective touchpads and/or adjusting interpretation of touch data from the respective touchpads in accordance with the determined position.

Accordingly, the following example cases could apply when the moveable member is determined to be in the first position and/or when the moveable member is determined to be in the second position. Additionally, these cases may each correspond to a different operational mode that is loaded in response to a determined position of the moveable member.

In one case, the computing device 200 may deactivate the different touchpad and/or disregard touch data from the different touchpad while activating the curved touchpad and/or interpreting touch data from the curved touchpad. In another case, the computing device 200 may deactivate the curved touchpad and/or disregard touch data from the curved touchpad while activating the different touchpad and/or interpreting touch data from the different touchpad. In yet another case, the computing device 200 may deactivate both touchpads and/or disregard touch data from both touchpads. In yet another case, the computing device 200 may activate both touchpads and/or interpret touch data from both touchpads. In this case, as further discussed below, interpreting the touch data may involve determine touch gestures separately for each touchpad or may involve using touch data from both touchpads to collectively determine one or more touch gestures. Other cases and combinations are also possible.

Depending on the case, the computing device 200 may determine at least one touch gesture in a way that is based on position of the moveable member. For instance, the computing device 200 may receive from the controller 300 input data that is generated by the controller in accordance with the determined operational mode. This input data may be indicative of (i) detected rotation of the knob, (ii) first touch data detected at the curved touchpad during the rotation, and/or (iii) second touch data detected at the different touchpad during the rotation. Based on the first and/or second touch data, the computing device 200 may determine at least one touch gesture and may then generate command(s) for control of a device (e.g., robotic system 100) based on the at least one touch gesture and/or the rotation of the knob 312.

Figure 12:
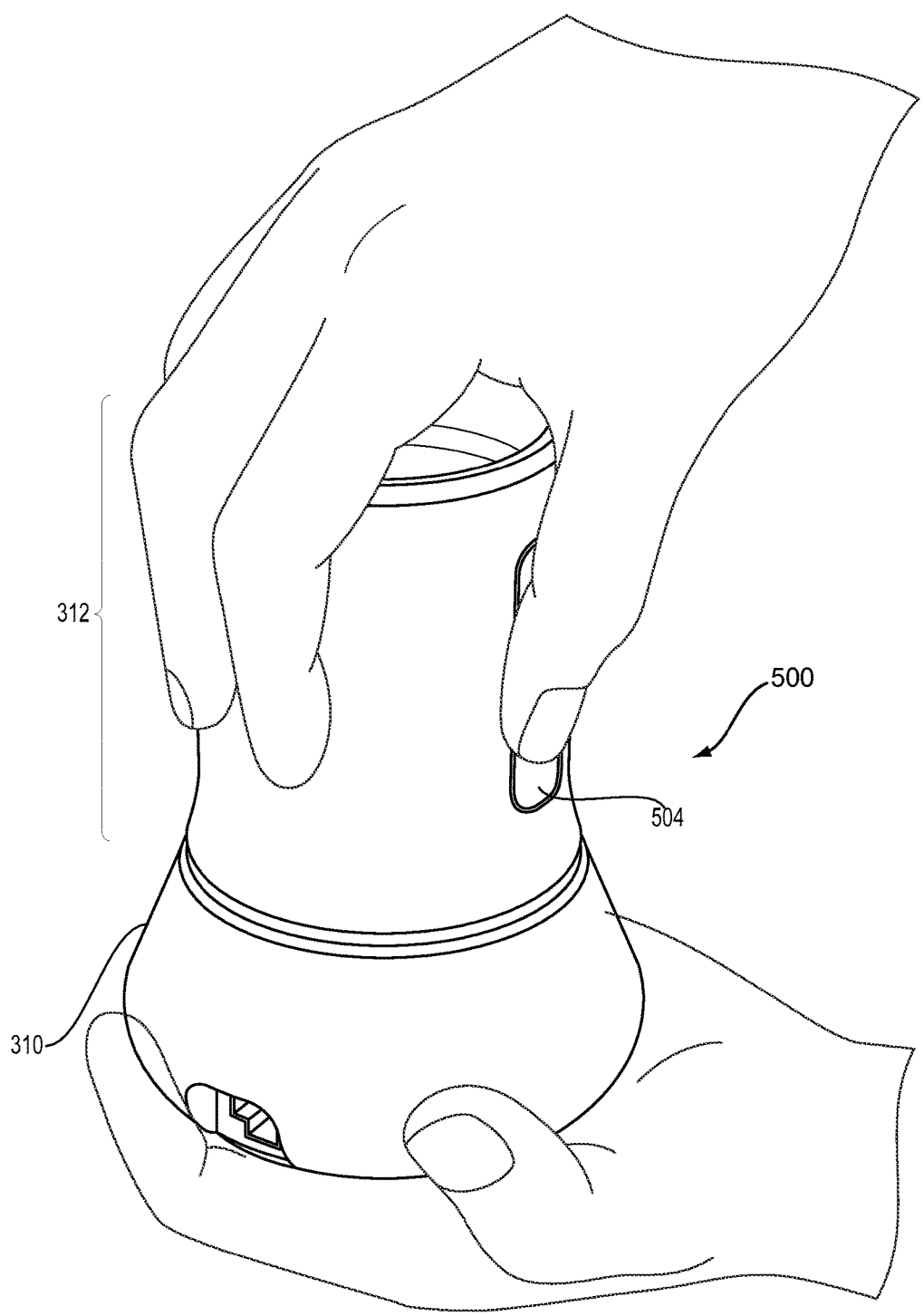
FIGS. 12, 13A, and 13B illustrate example touch gestures on a hand-holdable controller, according to an example implementation.

FIG. 12 as well as 13A and 13B depict example touch gestures that could be determined by the computing device 200. In particular, FIG. 12 illustrates a touch gesture that involves touch on both the curved surface of the knob 312 and the lever 504, while the lever 504 is in the second position. With the above arrangements, the computing device 200 may receive (i) first touch data detected by the curved touchpad on the curved surface of the knob 312 and (ii) second touch data detected by the different touchpad on the lever 504. Accordingly, the first and second touch data may collectively correspond to the touch gesture. As such, the computing device 200 may then use the first and second touch data to determine the shown touch gesture.

To do so, the computing device 200 may have stored thereon first coordinates associated with the curved touchpad. Such first coordinates may correspond to the entire surface of the knob 312 except for locations corresponding to the recess 502 (e.g., "missing" coordinates). The computing device 200 may then determine, based on the first touch data, portions of the first coordinates at which touch was detected. Additionally, the computing device 200 may also have stored thereon second coordinates associated with the different touchpad. Such second coordinates may correspond to the outside surface of the lever 504 and these coordinates may thus correspond to the above-mentioned "missing" coordinates, so as to complement the first coordinates. The computing device 200 may then determine, based on the second touch data, portions of these second coordinates at which touch was detected.

With this arrangement, the computing device 200 may then use a combination of the determined portions at which touch was detected so as to determine the at least one touch gesture. By way of example, the computing device 200 may do so by referring to mapping data that correlates each combination with a respective touch gesture and then determining the touch gesture based on the mapping data. Other arrangements are also possible for determine at least one touch gesture based on combination of the first and second touch data.

Figure 13A:
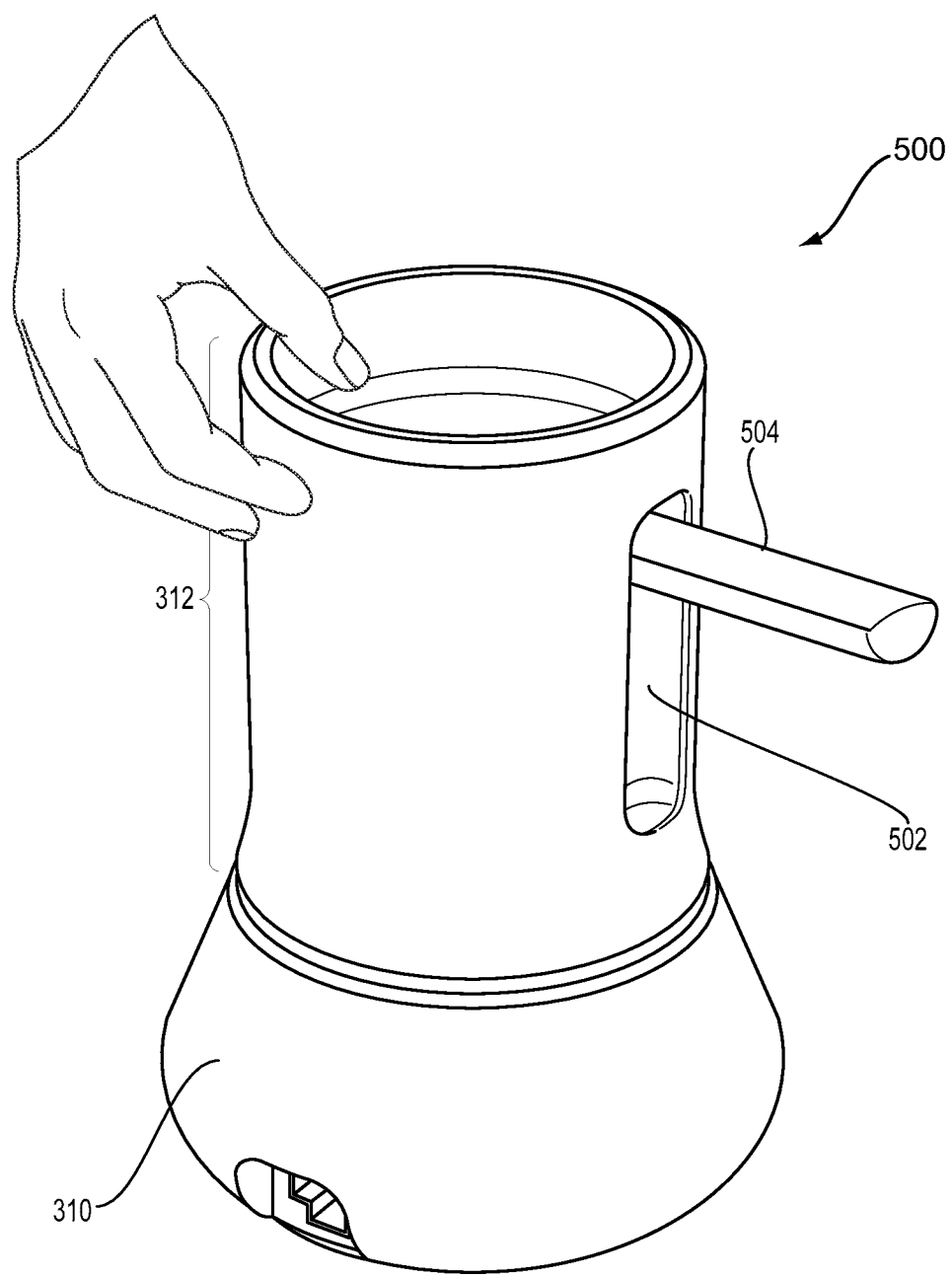
Figure 13B:
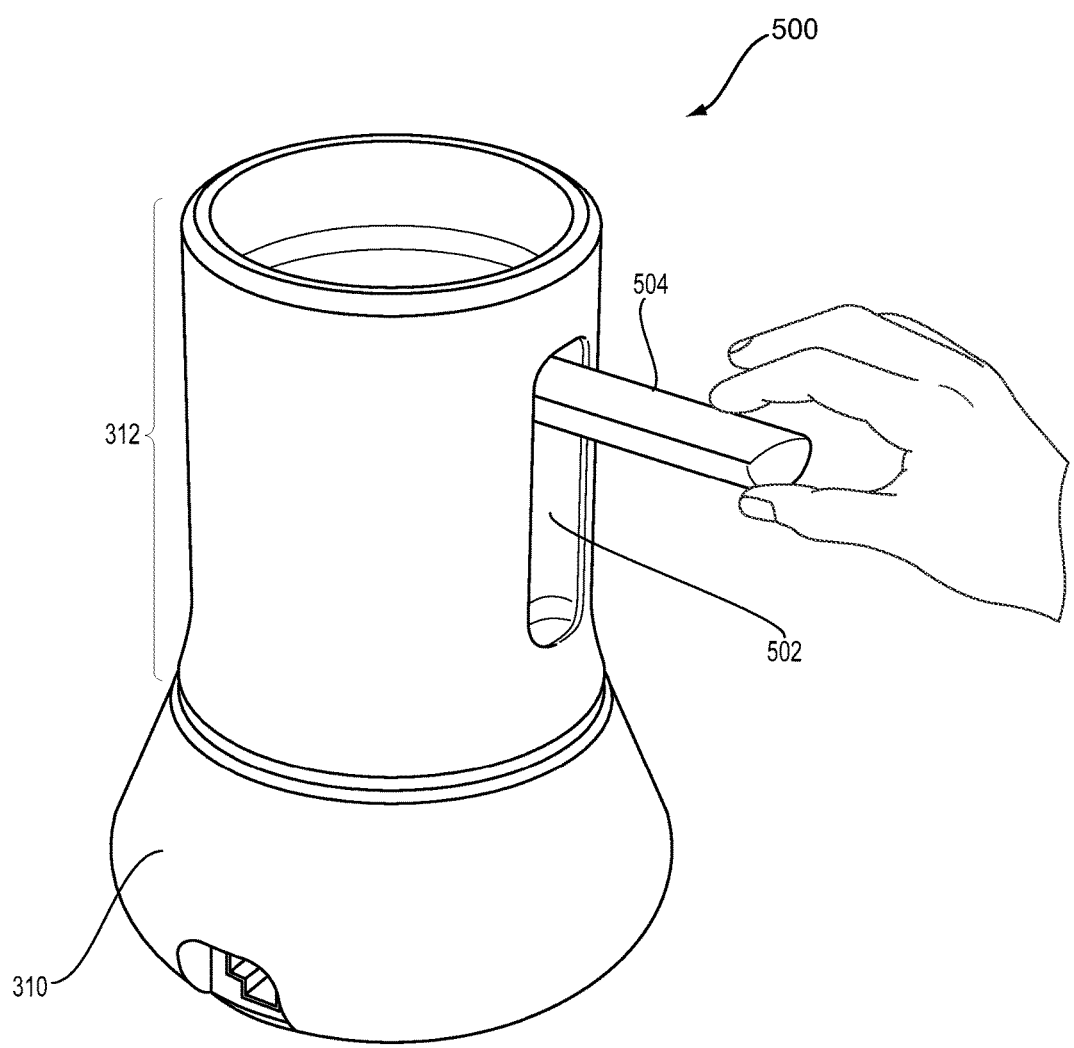

FIGS. 13A and 13B respectively illustrates a first touch gesture that involves touch on the curved surface of the knob 312 and a second touch gesture that involves touch on the lever 504, while the lever 504 is in the first position during the first and second touch gestures. As shown, the first touch gesture involves touch provided near the distal end 325b using an index finger and a middle finger. Whereas, the second gesture involves touch provided near an end of the moveable member using a thumb and an index finger. Further, these first and second touch gestures could be performed simultaneously or could be performed at different times.

In either case, the computing device 200 may simultaneously or separately receive (i) first touch data detected by the curved touchpad on the curved surface of the knob 312 and (ii) second touch data detected by the different touchpad on the lever 504. In this example, the first touch data may thus correspond to the first touch gesture and the second data may thus correspond to the second touch gesture. As such, the computing device 200 may determine the first touch gesture at the curved surface based on the first touch data and may separately determine the second touch gesture at the moveable member the based on the second touch data. Other examples are also possible.

V. CONCLUSION

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

We claim:

1. A controller system comprising:
   a rotatable knob having a curved surface;
   at least one motor that is operable to apply torque to the rotatable knob;
   a curved touchpad arranged to sense touch gestures on the curved surface; and
   a moveable member that is mechanically adjustable between a first position and a second position,
      wherein, in the first position, the moveable member is coupled to the rotatable knob and extends radially from the curved surface along a radial axis, such that application of a force perpendicular to the radial axis to the moveable member causes rotation of the rotatable knob, and
      wherein, in the second position, the moveable member provides accessibility to the curved surface of the rotatable knob.

2. The controller system of claim 1, wherein the curved surface has a recess formed thereon, wherein the moveable member comprises a lever having an end that is coupled onto the curved surface,
   wherein at the second position the lever is adapted onto the recess, and
   wherein the lever is mechanically adjustable between the first position and the second position by way of rotation about the end that is coupled onto the curved surface.

3. The controller system of claim 1, wherein the curved surface has a hole formed thereon, wherein the moveable member comprises a bar that is insertable into the hole,
   wherein at the first position the bar is inserted into the hole, and
   wherein the bar is mechanically adjustable between the first position and the second position by way of being removable from the hole.

4. The controller system of claim 1, wherein the curved surface comprises (i) a first hole formed thereon and (ii) a second hole formed thereon at an end of the curved surface that is opposite to the first hole, wherein the moveable member comprises a bar that is insertable into the first and second holes,
   wherein at the first position the bar is inserted into both the first and second holes, and
   wherein the bar is mechanically adjustable between the first position and the second position by way of being removable from the first and second holes.

5. The controller system of claim 1, wherein the curved surface has a hole formed thereon, wherein the moveable member comprises a bar that is coupled to the curved surface by slidably engaging the hole,
   wherein at the first position the bar slidably engages the hole such that the bar protrudes from the curved surface by a first amount, and
   wherein at the second position the bar slidably engages the hole such that the bar protrudes from the curved surface by a second amount that is less than the first amount.

6. The controller system of claim 5, wherein the second amount substantially corresponds to a zero amount.

7. The controller system of claim 5, further comprising a latch system,
   wherein the latch system fixes the bar at the second position, and
   wherein the bar is mechanically adjustable between the second position and the first position by way of the latch system releasing the bar such that the bar is slidably moveable in the hole while at the first position.

8. The controller system of claim 1, wherein the moveable member comprises at least one element that slidably engages in at least one channel of the rotatable knob,
   wherein at the first position the at least one element is keyed onto the at least one channel by way of a sliding engagement, and
   wherein the moveable member being mechanically adjustable between the first position and the second position comprises the moveable member being detachable from the at least one channel by way of the sliding engagement.

9. The controller system of claim 1, wherein the moveable member has at least one channel formed thereon, wherein the rotatable knob slidably engages in the at least one channel,
   wherein at the first position the rotatable knob is keyed onto the at least one channel by way of a sliding engagement, and
   wherein the moveable member being mechanically adjustable between the first position and the second position comprises the moveable member being detachable from the rotatable knob by way of the sliding engagement.

10. The controller system of claim 1, wherein the at least one motor is operable to apply torque to the rotatable knob so as to provide feedback at the first and second positions.

11. The controller system of claim 1, wherein application of an external torque to the rotatable knob, while the moveable member is in the second position, causes rotation of the rotatable knob.

12. A controller comprising:
    a rotatable knob having a curved surface, wherein the curved surface has a recess formed thereon;
    at least one motor that is operable to apply torque to the rotatable knob;
    a curved touchpad arranged to sense touch on the curved surface; and
    a lever that (i) has an end that is coupled onto the curved surface and (ii) is mechanically adjustable between a first position and a second position by way of rotation about the end,
       wherein, in the first position, the lever extends along a radial axis relative to the curved surface, such that application of a force perpendicular to the radial axis to the lever causes rotation of the rotatable knob, and
       wherein, in the second position, the lever is adapted onto the recess and provides accessibility to the curved surface.

13. The controller of claim 12, wherein, in the second position, the lever does not prevent rotation of the rotatable knob when an external torque is applied to the rotatable knob.

14. The controller of claim 12, wherein the lever comprises a particular surface having curvature that is substantially the same as curvature of the curved surface, so as to collectively form a continuous surface while the lever is adapted onto the recess.

15. The controller of claim 12, further comprising a different touchpad arranged to sense touch on the lever, and wherein, while the lever is in the second position, (i) the curved touchpad is configured to generate first touch data and the different touchpad is configured to generate second touch data and (ii) the first touch data and the second touch data collectively correspond to at least one particular touch gesture.

16. A method comprising:
   determining, by a computing device, position of a moveable member relative to a controller that comprises a rotatable knob having a curved touchpad arranged to sense touch on a curved surface of the rotatable knob, wherein the position is either (a) a first position at which the moveable member extends radially to the curved surface or (b) a second position at which the moveable member provides accessibility to the curved surface;
   based on the determined position, determining an operational mode for the controller from among a plurality of operational modes; and
   causing the controller to operate in accordance with the determined operational mode.

17. The method of claim 16, wherein the controller further comprises a different touchpad arranged to sense touch on the moveable member, the method further comprising:
   receiving from the controller, by the computing device, input data that is generated by the controller in accordance with the operational mode, wherein the input data is indicative of (i) detected rotation of the rotatable knob, (ii) first touch data detected at the curved touchpad during the rotation, and (iii) second touch data detected at the different touchpad during the rotation;
   determining, by the computing device, at least one touch gesture based on the first and second touch data; and
   based at least on the detected rotation and the determined at least one touch gesture, generating one or more commands for control of a particular device.

18. The method of claim 17, wherein, if the determined position is the second position, (i) the first touch data corresponds to a first portion of the at least one touch gesture, (ii) the second touch data corresponds to a second portion of the at least one touch gesture, and (iii) determining the at least one touch gesture comprises determining the at least one touch gesture based on a combination of the first and second portions.

19. The method of claim 17, wherein, if the determined position is the first position, determining the at least one touch gesture comprises (i) determining at least one particular touch gesture at the curved surface based on the first touch data and (ii) separately determining at least one other touch gesture at the moveable member based on the second touch data.

20. The method of claim 16, wherein the controller further comprises at least one motor, and wherein causing the controller to operate in accordance with the determined operational mode comprises:
   causing the controller to operate the at least one motor to affect rotation of the rotatable knob in accordance with the determined position of the moveable member.

\* \* \* \* \*